US012537696B2

(12) United States Patent
Han

(10) Patent No.: US 12,537,696 B2
(45) Date of Patent: Jan. 27, 2026

(54) NETWORK COMMUNICATION METHOD AND APPARATUS, COMPUTER DEVICE, AND STORAGE MEDIUM FOR VERIFYING CONSISTENCY OF SHORT DIGITAL CERTIFICATES

(71) Applicant: Tencent Technology (Shenzhen) Company Limited, Shenzhen (CN)

(72) Inventor: Xueyang Han, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 176 days.

(21) Appl. No.: 18/372,601

(22) Filed: Sep. 25, 2023

(65) Prior Publication Data

US 2024/0356760 A1 Oct. 24, 2024

Related U.S. Application Data

(63) Continuation of application No. PCT/CN2023/112150, filed on Aug. 10, 2023.

(30) Foreign Application Priority Data

Apr. 18, 2023 (CN) .......................... 202310424448.5

(51) Int. Cl.
*H04L 9/32* (2006.01)
*H04L 9/08* (2006.01)

(52) U.S. Cl.
CPC .......... *H04L 9/3263* (2013.01); *H04L 9/0819* (2013.01)

(58) Field of Classification Search
CPC ... H04L 9/3263; H04L 9/0819; H04L 9/0838; H04L 9/3268

(Continued)

(56) References Cited

U.S. PATENT DOCUMENTS 9,507,859 B1 11/2016 Roskind
11,502,855 B1 * 11/2022 Jerrell ................. H04L 63/0471
(Continued)

FOREIGN PATENT DOCUMENTS

CN 110324283 A 10/2019
CN 114257410 A 3/2022
(Continued)

OTHER PUBLICATIONS

Tencent Technology, ISR, PCT/CN2023/112150, Dec. 11, 2023, 2 pgs.

(Continued)

*Primary Examiner* — Bryan F Wright
(74) *Attorney, Agent, or Firm* — Morgan, Lewis & Bockius LLP

(57) ABSTRACT

This application provides a network communication method performed by a computer device acting as a second communication terminal. After transmitting an encrypted communication connection request for a first digital certificate to a first communication terminal, the second terminal receives a second digital certificate from the first communication terminal. The second terminal then receives a compressed digital certificate returned by the first communication terminal, the compressed digital certificate being obtained by the first communication terminal through compression of the first digital certificate. Next the second terminal performs consistency verification on the second digital certificate and the compressed digital certificate. After determining that the consistency verification succeeds the second terminal then generates an encrypted communication key; and performs encrypted communication with the first communication terminal based on the encrypted communication key.

17 Claims, 11 Drawing Sheets

(58) Field of Classification Search
USPC .......................................................... 713/175
See application file for complete search history.

(56) References Cited

U.S. PATENT DOCUMENTS 12,212,662 B2 *  1/2025  Sheng ................. H04L 63/0823
2023/0023647 A1  1/2023  Voss et al.

FOREIGN PATENT DOCUMENTS

CN      115021932 A    9/2022
JP      2014014012 A   1/2014

OTHER PUBLICATIONS

Tencent Technology, Extended European Search Report, EP Patent Application No. 23786455.8, Sep. 13, 2024, 10 pgs.
Wesley Chou, "Inside SSL: The Secure Sockets Layer Protocol", IT Professional, vol. 4, Issue 4, DOI: 10.1109/MITP.2002.1046644, Jul. 2002, 6 pgs.
Tencent Technology, Japanese Office Action, JP Patent Application No. 2023-571536, Jun. 18, 2025.

* cited by examiner

NETWORK COMMUNICATION METHOD AND APPARATUS, COMPUTER DEVICE, AND STORAGE MEDIUM FOR VERIFYING CONSISTENCY OF SHORT DIGITAL CERTIFICATES

CROSS-REFERENCE TO RELATED APPLICATIONS

This application is a continuation application of PCT Patent Application No. PCT/CN2023/112150, entitled "NETWORK COMMUNICATION METHOD AND APPARATUS, COMPUTER DEVICE, AND STORAGE MEDIUM" filed on Aug. 10, 2023, which claims priority to Chinese Patent Application No. 2023104244485, filed with China National Intellectual Property Administration on Apr. 18, 2023 and entitled "NETWORK COMMUNICATION METHOD AND APPARATUS, COMPUTER DEVICE, AND STORAGE MEDIUM", all of which is incorporated herein by reference in its entirety.

FIELD OF THE TECHNOLOGY

This application relates to the field of communication technologies, and in particular, to a network communication method and apparatus, a computer device, and a storage medium.

BACKGROUND OF THE DISCLOSURE

As network communication develops, in order to improve security of network communication, both communication parties need to establish an encrypted communication connection. During establishment of the encrypted communication connection, identities of both communication parties need to be recognized through transmission of a digital certificate. As quantum computers develop, in order to improve the security of network communication in the era of quantum computers, the transmitted digital certificate needs to support a quantum-resistant algorithm during the establishment of the encrypted communication connection.

In related art, when a data packet of the digital certificate transmitted during the establishment of the encrypted communication connection is relatively large, the data packet of the digital certificate is usually split into a plurality of relatively small data packets, and then the relatively small data packets are transmitted to achieve transmission of the digital certificate.

However, the manner of splitting the relatively large digital certificate into the data packets and transmitting the plurality of split relatively small data packets increases a transmission duration, and easily leads to a connection establishment failure, which reduces communication efficiency.

SUMMARY

Based on the above, it is necessary to provide a network communication method and apparatus, a computer device, a computer-readable storage medium, and a computer program product for the above technical problems.

In an aspect, this application provides a network communication method, which is performed by a computer device acting as a second communication terminal. The method includes: transmitting an encrypted communication connection request to a first communication terminal; receiving a second digital certificate from the first communication terminal, the second digital certificate being a digital certificate actually received by the second communication terminal after the first communication terminal returns a first digital certificate in response to the encrypted communication connection request; receiving a compressed digital certificate returned by the first communication terminal in response to a first key negotiation request transmitted to the first communication terminal, the compressed digital certificate being obtained through compression of the first digital certificate; performing consistency verification on the second digital certificate and the compressed digital certificate; determining that the consistency verification succeeds and identity verification of the first communication terminal based on the second digital certificate succeeds; generating an encrypted communication key; and performing encrypted communication with the first communication terminal based on the encrypted communication key.

In another aspect, this application further provides a computer device acting as a second communication terminal. The computer device includes a memory and one or more processors, the memory storing computer-readable instructions, the computer-readable instructions, when executed by the processors, causing the computer device to perform the operations of the above network communication method.

In another aspect, this application further provides one or more non-transitory computer-readable storage media. The non-transitory computer readable storage media store computer readable instructions, the computer readable instructions, when executed by one or more processors of a computer device acting as a second communication terminal, causing the computer device to implement the operations of the above network communication method.

In another aspect, this application provides a network communication method, which is performed by a first communication terminal. The method includes: receiving an encrypted communication connection request transmitted by a second communication terminal; transmitting a first digital certificate to the second communication terminal in response to the encrypted communication connection request, wherein the second communication terminal receives a second digital certificate in response to the transmission of the first digital certificate for identity verification of the first communication terminal; receiving a first key negotiation request transmitted by the second communication terminal; transmitting a compressed digital certificate to the second communication terminal in response to the first key negotiation request, wherein the compressed digital certificate is obtained through compression of the first digital certificate and the second communication terminal performs consistency verification on the second digital certificate and the compressed digital certificate; generating an encrypted communication key in response to a communication from the second communication terminal that the consistency verification succeeds and the identity verification succeeds; and performing encrypted communication with the second communication terminal based on the encrypted communication key.

In another aspect, this application further provides a computer device acting as a first communication terminal. The computer device includes a memory and one or more processors, the memory storing computer-readable instructions, the computer-readable instructions, when executed by the processors, causing the computer device to perform the operations of the above network communication method.

In another aspect, this application further provides one or more non-transitory computer-readable storage media. The non-transitory computer readable storage media store computer readable instructions, the computer readable instructions, when executed by one or more processors of a computer device acting as a first communication terminal, causing the computer device to implement the operations of the above network communication method.

In another aspect, this application further provides a computer program product. The computer program product stores computer-readable instructions, the computer-readable instructions, when executed by a processor, implementing the operations of the above network communication method.

Details of one or more embodiments of this application are provided in the following drawings and descriptions. Other features, objectives, and advantages of this application become apparent from the specification, the drawings, and the claims.

BRIEF DESCRIPTION OF THE DRAWINGS

In order to describe the technical solutions of the embodiments of this application more clearly, the drawings required for describing the embodiments are briefly introduced below. Apparently, the drawings in the following description show only some embodiments of this application, and other embodiments are also contemplated.

DESCRIPTION OF EMBODIMENTS

In order to make objectives, technical solutions, and advantages of this application clearer, this application is further described in detail below with reference to the drawings and embodiments. It is to be understood that the specific embodiments described herein are merely used for explaining this application, and are not used for limiting this application.

Figure 1:
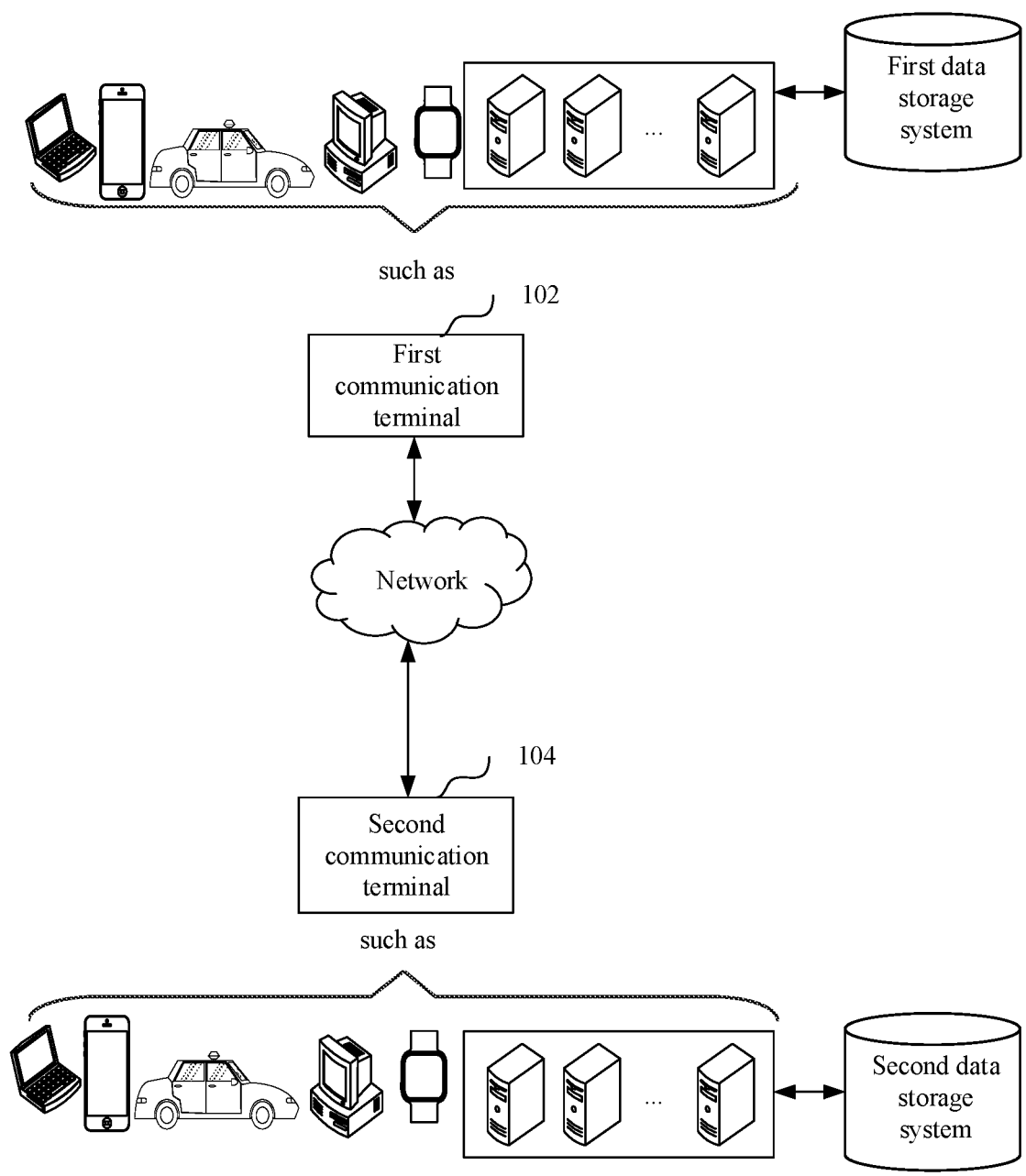
FIG. 1 is a diagram of an application environment of a network communication method according to some embodiments.

A network communication method provided in an embodiment of this application may be applied to an application environment shown in FIG. 1. The application environment includes a first communication terminal 102 and a second communication terminal 104. The first communication terminal 102 communicates with the second communication terminal 104 through a network. A first data storage system may store data to be processed by the first communication terminal 102. The first data storage system may be integrated on the first communication terminal 102, or may be arranged on a cloud or another server. A second data storage system may store data to be processed by the second communication terminal 104. The second data storage system may be integrated on the second communication terminal 104, or may be arranged on the cloud or another server.

Specifically, when an unencrypted communication connection has been established between the second communication terminal 104 and the first communication terminal 102, for example, a transmission control protocol (TCP) connection has been established, the second communication terminal 104 may send an encrypted communication connection request to the first communication terminal 102 for encrypted communication with the first communication terminal 102. The first communication terminal 102 transmits a first digital certificate to the second communication terminal in response to the encrypted communication connection request. The encrypted communication connection request indicates that the first communication terminal 102 needs to return the first digital certificate used for identifying an identity of the first communication terminal 102. The first communication terminal 102 is another end communicating with the second communication terminal 104. After the first communication terminal 102 returns the first digital certificate to the second communication terminal, the second communication terminal 104 actually receives a second digital certificate. If the first digital certificate is not tampered with during transmission, the second digital certificate is the same as the first digital certificate. If the first digital certificate is tampered with during transmission, the second digital certificate is different from the first digital certificate. The second communication terminal 104 sends a first key negotiation request to the first communication terminal 102. The first communication terminal 102 returns a compressed digital certificate to the second communication terminal 104 in response to the first key negotiation request. The compressed digital certificate is obtained through compression of the first digital certificate. After receiving the compressed digital certificate, the second communication terminal 104 performs consistency verification on the second digital certificate and the compressed digital certificate. When the consistency verification succeeds and identity verification of the first communication terminal based on the second digital certificate succeeds, the second communication terminal generates an encrypted communication key. After generating the encrypted communication key, the second communication terminal 104 performs communication with the first communication terminal 102 based on the encrypted communication key. When the consistency verification succeeds and the identity verification of the first communication terminal based on the second digital certificate succeeds, the first communication terminal also generates the encrypted communication key. The encrypted communication key generated by the first communication terminal is the same as the encrypted communication key generated by the second communication terminal.

The first communication terminal 102 and the second communication terminal 104 may be, but are not limited to, various desktop computers, notebook computers, smartphones, tablet computers, Internet of things devices, and portable wearable devices. The Internet of things devices may be a smart speaker, a smart television, a smart air-conditioner, or a smart on-board device, or may be an independent physical server, or may be a server cluster composed of a plurality of physical servers or a distributed system, or may be a cloud server that provides basic cloud computing services such as a cloud service, a cloud database, cloud computing, a cloud function, cloud storage, a network service, cloud communication, a middleware service, a domain name service, a network security service such as cloud security and host security, CDN, big data, and an artificial intelligence platform. The portable wearable devices may be a smartwatch, a smart bracelet, a headset, or the like. The first communication terminal 102 and the second communication terminal 104 may be directly or indirectly connected through wired or wireless communication, which is not limited herein in this application.

The network communication method provided in this application may be applied to a blockchain system. The blockchain system is formed by a plurality of nodes (a computing device in an access network in any form, such as a server or a user terminal) and a client.

A peer-to-peer (P2P) network is formed between the nodes. A P2P protocol is an application-layer protocol running over a TCP. In the blockchain system, any machine such as a server or terminal may join the blockchain system and become a node. The node includes a hardware layer, an intermediate layer, an operating system layer, and an application layer. For example, the first communication terminal and the second communication terminal may be nodes in the blockchain system. When the network communication method provided in this application is applied to the blockchain system, efficiency of communication between the nodes in the blockchain system can be improved.

Figure 2:
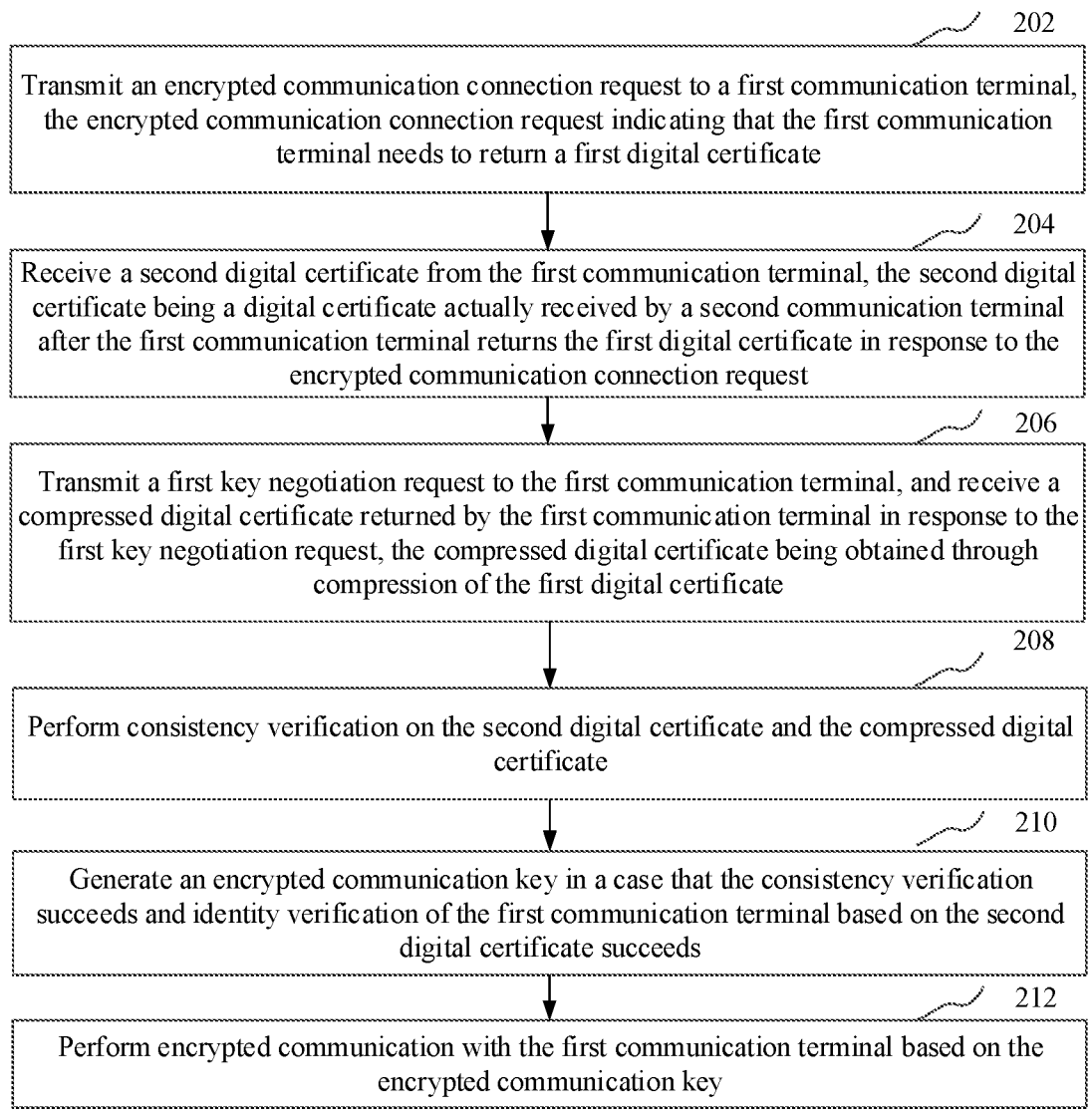
FIG. 2 is a schematic flowchart of a network communication method according to some embodiments.

In some embodiments, as shown in FIG. 2, a network communication method is provided. For example, the method is applied to the second communication terminal 104 in FIG. 1. The method includes the following steps:

Step 202: Transmit an encrypted communication connection request to a first communication terminal, the encrypted communication connection request indicating that the first communication terminal needs to return a first digital certificate.

The digital certificate is used for recognizing an identity of a communication party in Internet communication. The first digital certificate is used for recognizing an identity of the first communication terminal. The first communication terminal and the second communication terminal are two parties in communication. The first digital certificate may be a digital certificate satisfying any standard, for example, a digital certificate satisfying the X.509 standard. The digital certificate satisfying the X.509 standard may alternatively be referred to as an X.509 digital certificate or an x509 digital certificate. X.509 is a standard format of a public key infrastructure (PKI). The first digital certificate may alternatively be an X.509 digital certificate supporting a quantum-resistant algorithm. In the X.509 digital certificate supporting the quantum-resistant algorithm, fields such as an alt-signature-algorithm (a signature algorithm), subject-alt-public-key-info (a public key of the certificate subject), and an alt-signature-value (a signature of a certificate issuer) are added to an extended field (X509v3 extensions) to support the quantum-resistant algorithm. For example, a data structure of the X. 509 digital certificate supporting the quantum-resistant algorithm may be as follows:

```
X.509 Certificate:   //X.509 digital certificate
  Data:  //Data field
    Version: 3 (0x2)  //Version number
    Serial Number:3027  //Serial number
    Signature Algorithm: ecdsa-with-SHA256  //Signature algorithm
    Issuer: C=CN,ST=BJ,O=XX, CN= CA_TEST  //Issuer
    Validity  //Validity
      Not Before: Jan 9 17:33:02 2018 GMT //Invalid before 17:33:02 Jan 9 2018 Greenwich Mean Time (GMT)
      Not After : Jan 22 17:33:02 2019 GMT //Invalid after 17:33:02 Jan 22 2019 GMT
    Subject: C=CN, ST= BJ, O=XX, CN=ServerCRT_TEST//Name of a certificate holder
    Subject Public Key Info://Algorithm, parameter, and value of a public key of the certificate holder;
      Public Key Algorithm: id-ecPublicKey
        Public-Key: (256 bit)
          [...omitted for brevity...]
      X509v3 extensions://Extended field
        X509v3 Basic Constraints:
          CA:FALSE
        Alt-Signature-Algorithm://Alternative signature algorithm
          sha512WithDillithiun2
        Subject-Alt-Public-Key-Info://Public key of a certificate subject
          Public Key:
            00:00:00:01:00:00:00:07:00:00:00:03:1c:ba
            [...omitted for brevity...]//Omitted for brevity
        Alt-Signature-Value: //Signature of a certificate issuer
          Signature:
            23:82:1a:74:01:00:30:06:af:1d:d3
            [...omitted for brevity...]//Omitted for brevity
```

Since the X.509 digital certificate supporting the quantum-resistant algorithm includes the public key of the certificate subject and the signature of the certificate issuer, a data amount of the X.509 digital certificate supporting the quantum-resistant algorithm is relatively large. The quantum-resistant algorithm is configured to protect security of transmitted data on a quantum computer.

The encrypted communication connection request is used for requesting to establish a communication link for encrypted communication. The encrypted communication means that during communication, to-be-transmitted data needs to be encrypted before transmission. That is to say, the encrypted communication means that transmitted data and received data during communication are both encrypted data. To-be-transmitted data is encrypted and then transmitted, and the received encrypted data needs to be decrypted.

Specifically, the encrypted communication connection request may be transmitted through an unencrypted communication link when an unencrypted communication link has been established between the first communication terminal and the second communication terminal. The unencrypted communication link is used for data transmission in a plaintext form. The unencrypted communication link, for example, may be a communication link established through the TCP connection.

In some embodiments, when a data amount of the first digital certificate is greater than a data amount threshold, the encrypted communication connection request indicates that the first communication terminal needs to return the first digital certificate for identifying the identity of the first communication terminal. The first communication terminal is another end communicating with the second communication terminal. The data amount threshold may be set as required, for example, may be set based on a data amount of a maximum transmission unit (MTU). For example, the data amount threshold may be the data amount of the MTU, or the data amount threshold may be a product of the data amount of the MTU and a preset coefficient. The preset coefficient is a value in a range of 0.5 to 1, such as 0.8 or 1.

In some embodiments, the second communication terminal transmits the encrypted communication connection request to the first communication terminal to implement encrypted communication with the first communication terminal. In response to the encrypted communication connection request, the first communication terminal obtains the first digital certificate and transmits the first digital certificate to the second communication terminal.

Step 204: Receive a second digital certificate from the first communication terminal, the second digital certificate being a digital certificate actually received by a second communication terminal after the first communication terminal returns the first digital certificate in response to the encrypted communication connection request.

Specifically, in response to the encrypted communication connection request, the first communication terminal obtains the first digital certificate, and transmits the first digital certificate to the second communication terminal through an unencrypted communication link. Since security of the data transmission through the unencrypted communication link cannot be ensured, the first digital certificate may be tampered with during the transmission. In this case, a result transmitted to the second communication terminal, that is, the second digital certificate received by the second communication terminal, may not be the first digital certificate. When the first digital certificate is not tampered with, the digital certificate received by the second communication terminal, that is, the second digital certificate, is the first digital certificate.

Step 206: Transmit a first key negotiation request to the first communication terminal, and receive a compressed digital certificate returned by the first communication terminal in response to the first key negotiation request, the compressed digital certificate being obtained through compression of the first digital certificate.

The key negotiation request is used for triggering key negotiation between the first communication terminal and the second communication terminal, so as to negotiate a common key. After the common key is negotiated, before data transmission with the second communication terminal, the first communication terminal encrypts the to-be-transmitted data through the common key, and then the first communication terminal transmits an encrypted result. The common key may alternatively be referred to as an encrypted communication key.

The second communication terminal may transmit the first key negotiation request to the first communication terminal during the transmission of the first digital certificate by the first communication terminal, or may transmit the first key negotiation request to the first communication terminal after receiving the complete second digital certificate.

Specifically, the first communication terminal has a first public key and a first private key. The first public key may be used for decrypting data encrypted by using the first private key, and the first private key may be used for decrypting data encrypted by using the first public key. The second communication terminal has a second public key and a second private key. The second public key may be used for decrypting data encrypted by using the second private key, and the second private key may be used for decrypting data encrypted by using the second public key. During the key negotiation between the first communication terminal and the second communication terminal, data to be transmitted by the first communication terminal to the second communication terminal may be encrypted by using the second public key, and data to be transmitted by the second communication terminal to the first communication terminal may be encrypted by using the first public key. For example, the first key negotiation request may be encrypted through the first public key.

In some embodiments, the compressed digital certificate may be generated by the first communication terminal by default, or may be generated by the first communication terminal in response to the first key negotiation request. Specifically, in response to the first key negotiation request, the first communication terminal obtains the first digital certificate, compresses at least partial content in the first digital certificate to obtain the compressed digital certificate corresponding to the first digital certificate, and transmits the compressed digital certificate to the second communication terminal.

In some embodiments, the first communication terminal may compress all content included in the first digital certificate to obtain the compressed digital certificate. For example, the first communication terminal may perform a hash calculation on all content included in the first digital certificate, and use a result of the hash calculation as the compressed digital certificate. Alternatively, the first communication terminal may compress a first content in the first digital certificate, for example, perform a hash calculation, to obtain a first compressed content corresponding to the first content, and then the first communication terminal may replace the first content in the first digital certificate with the first compressed content corresponding to the first content, to obtain the compressed digital certificate corresponding to the first digital certificate.

Step 208: Perform consistency verification on the second digital certificate and the compressed digital certificate.

Figure 3:
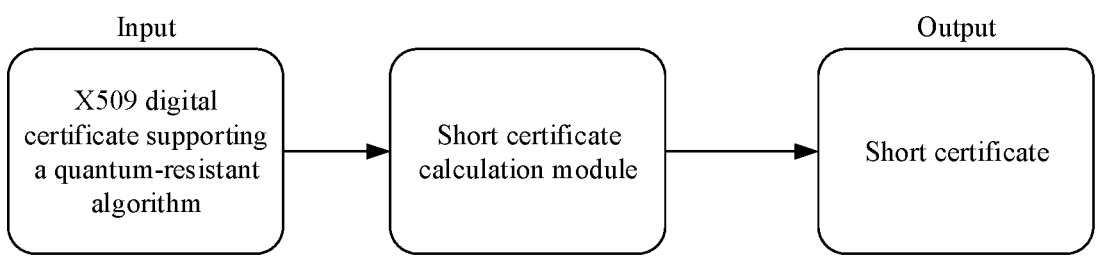
FIG. 3 is a diagram of a principle of generating a compressed digital certificate according to some embodiments.

Specifically, the compressed digital certificate is obtained through compression of the first digital certificate in a preset compression manner. The preset compression manner includes but is not limited to a preset compression encoding algorithm. The compression encoding algorithm includes but is not limited to a hash algorithm. The hash algorithm includes but is not limited to SHA256, a Chinese national commercial cryptographic algorithm SM2, a Chinese national commercial cryptographic algorithm SM3, or the like. Since the compressed digital certificate is obtained through compression of the first digital certificate, a data amount of the compressed digital certificate is less than the data amount of the first digital certificate. Therefore, the compressed digital certificate may be referred to as a short certificate corresponding to the first digital certificate. For example, the first digital certificate is the x509 digital certificate supporting the quantum-resistant algorithm, and the preset compression manner is the SHA256. In this case, the short certificate corresponding to the first digital certificate may be calculated in the following manner: short certificate=SHA256 (the x509 digital certificate supporting the quantum-resistant algorithm). Since the hash algorithm has collision resistance, the x509 digital certificate supporting the quantum-resistant algorithm is in a one-to-one correspondence with the short certificate. Since the short certificate obtained through the hash algorithm has only fixed tens of bytes, an amount of data transmitted during network transmission can be reduced, thereby improving communication efficiency. The first communication terminal may have a short certificate calculation module. The short certificate calculation module is configured to compress an inputted digital certificate in the preset compression manner to generate a corresponding short certificate. As shown in FIG. 3, the x509 digital certificate supporting the quantum-resistant algorithm is inputted into the short certificate calculation module to output the short certificate.

In some embodiments, the second communication terminal may compress the second digital certificate in the preset compression manner, and use a result of the compression as a comparative digital certificate. When comparative digital certificate is consistent with the compressed digital certificate, it is determined that the second digital certificate is consistent with the first digital certificate. Otherwise, it is determined that the second digital certificate is inconsistent with the first digital certificate.

In some embodiments, the preset compression manner corresponds to a preset decompression manner. When the second communication terminal obtains the compressed digital certificate through decryption, the compressed digital certificate may be decompressed in the preset decompression manner to obtain the first digital certificate. Then the first digital certificate is compared with the second digital certificate. When a result of the comparison is consistent, it is determined that the second digital certificate is consistent with the first digital certificate. Otherwise, it is determined that the second digital certificate is inconsistent with the first digital certificate.

Step 210: Generate an encrypted communication key when the consistency verification succeeds and identity verification of the first communication terminal based on the second digital certificate succeeds.

The encrypted communication key is a symmetric key. In other words, data encrypted through the encrypted communication key may be decrypted through the encrypted communication key.

Specifically, when the consistency verification succeeds, it indicates that the second digital certificate is the first digital certificate, which means that the first digital certificate is accurately transmitted to the second communication terminal. When the consistency verification succeeds, the second communication terminal may perform identity verification on the first communication terminal through the second digital certificate, thereby preventing invalid identity verification when the second digital certificate is inconsistent with the first digital certificate. After the identity verification succeeds, the second communication terminal generates the encrypted communication key, and performs encrypted communication with the first communication terminal through the encrypted communication key.

In some embodiments, when the second digital certificate is consistent with the first digital certificate, the first communication terminal and the second communication terminal generate the same key, which is the encrypted communication key. When the second digital certificate is inconsistent with the first digital certificate, the second communication terminal transmits a notification indicating a negotiation failure to the first communication terminal, and the second communication terminal may re-perform the steps of transmitting the encrypted communication connection request to the first communication terminal.

In some embodiments, the second communication terminal generates a first random number, and encrypts the first random number by using the first public key of the first communication terminal, to obtain a first encrypted random number. The first key negotiation request may carry the first encrypted random number. In response to the first key negotiation request, the first communication terminal may further generate a second random number, encrypt the second random number by using the second public key of the second communication terminal to obtain a second encrypted random number, and transmit the second encrypted random number to the second communication terminal. The first communication terminal may decrypt the second encrypted random number by using the first private key, to obtain the second random number, and generate the encrypted communication key based on the first random number and the second random number. The second communication terminal may decrypt the first encrypted random number by using the second private key, to obtain the first random number, and generate the encrypted communication key based on the first random number and the second random number. The first communication terminal and the second communication terminal generate the same encrypted communication key. A manner of generating the encrypted communication key based on the first random number and the second random numbers is not limited herein. For example, the first random number and the second random number may be used as the encrypted communication key, or a hash calculation may be performed on the first random number and the second random number, and a result of the hash calculation may be used as the encrypted communication key.

Step 212: Perform encrypted communication with the first communication terminal based on the encrypted communication key.

Specifically, the encrypted communication key is a symmetric key. In other words, data encrypted through the encrypted communication key may be decrypted through the encrypted communication key. After the first communication terminal and the second communication terminal generate the encrypted communication key, data to be transmitted by the first communication terminal to the second communication terminal is encrypted by using the encrypted communication key, and data to be transmitted by the second communication terminal to the first communication terminal is also encrypted by using the encrypted communication key. After receiving the data encrypted by using the encrypted communication key transmitted by the second communication terminal, the first communication terminal decrypts the received data by using the encrypted communication key. After receiving the data encrypted by using the encrypted communication key transmitted by the first communication terminal, the second communication terminal decrypts the received data by using the encrypted communication key. In this way, the first communication terminal and the second communication terminal implement encrypted communication.

In the above network communication method, the encrypted communication connection request is transmitted to the first communication terminal. The encrypted communication connection request indicates that the first communication terminal needs to return the first digital certificate. The second digital certificate from the first communication terminal is received. The digital certificate is a digital certificate actually received by the second communication terminal after the first communication terminal returns the first digital certificate in response to the encrypted communication connection request. The first key negotiation request is transmitted to the first communication terminal. The compressed digital certificate returned by the first communication terminal in response to the first key negotiation request is received. The compressed digital certificate is obtained through compression of the first digital certificate. Consistency verification is performed on the second digital compressed certificate and the compressed digital certificate. When the consistency verification succeeds, and the identity verification of the first communication terminal based on the second digital certificate succeeds, the encrypted communication key is generated. Encrypted communication is performed with the first communication terminal based on the encrypted communication key. Since the first digital certificate is transmitted before the first key negotiation request is transmitted, that is, is transmitted before the key negotiation, and the compressed digital certificate corresponding to the first digital certificate is transmitted after the first key negotiation request is transmitted, that is, is transmitted during the key negotiation, and the first digital certificate is not transmitted during the key negotiation, an amount of data transmitted during the key negotiation is reduced, thereby reducing a key negotiation failure rate, and increasing a key negotiation success rate. In this way, efficiency of establishing the encrypted communication connection is improved, and the communication efficiency is improved.

In addition, when the consistency verification succeeds and the identity verification of the first communication terminal based on the second digital certificate succeeds, the encrypted communication key is generated. Therefore, the encrypted communication key is generated in a safe situation, thereby improving security of the encrypted communication.

In some embodiments, the first digital certificate is returned by the first communication terminal in response to the encrypted communication connection request when the data amount of the first digital certificate is greater than the data amount threshold. Specifically, the first communication terminal transmits the first digital certificate to the second communication terminal in response to the encrypted communication connection request when the data amount of the first digital certificate is greater than the data amount threshold.

In some embodiments, a data amount of a digital certificate of a first certificate type is greater than the data amount threshold, and a data amount of a digital certificate of a second certificate type is less than or equal to the data amount threshold. The data amount threshold may be set as required, for example, may be set based on a data amount of an MTU. For example, the data amount threshold may be the data amount of the MTU, or the data amount threshold may be a product of the data amount of the MTU and a preset coefficient. The preset coefficient is a value in a range of 0.5 to 1, such as 0.8 or 1.

In some embodiments, the first communication terminal determines a certificate type of the first digital certificate in response to the encrypted communication connection request, and transmits the first digital certificate to the second communication terminal when the certificate type of the first digital certificate is the first certificate type. For example, a first request response result for the encrypted communication connection request is transmitted to the second communication terminal. The first request response result carries the first digital certificate. The first request response result may be transmitted by the first communication terminal through the unencrypted communication link. Therefore, a response result actually received by the second communication terminal may be consistent or inconsistent with the first request response result. The second communication terminal transmits the first key negotiation request to the first communication terminal in response to the received response result.

Figure 4:
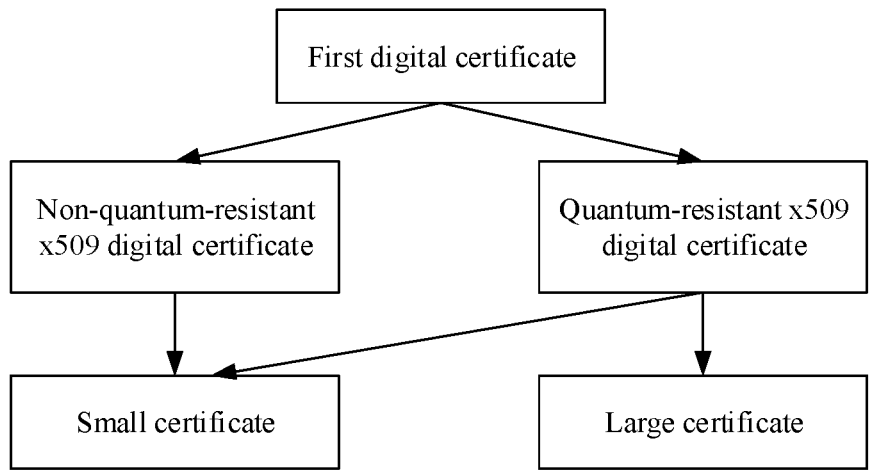
FIG. 4 is a diagram of a principle of determining a certificate type according to some embodiments.

In some embodiments, a data amount of a digital certificate that does not support the quantum-resistant algorithm is less than or equal to the data amount threshold, and a data amount of a digital certificate supporting the quantum-resistant algorithm may be greater than, equal to, or less than the data amount threshold. In response to the encrypted communication connection request, the first communication terminal determines that the certificate type of the first digital certificate is the second certificate type when the first communication terminal determines the first digital certificate is not the digital certificate that does not support the quantum-resistant algorithm. When it is determined that the first digital certificate is the digital certificate supporting the quantum-resistant algorithm, the data amount of the first digital certificate is calculated. If the data amount of the first digital certificate is greater than the data amount threshold, it is determined that the certificate type of the first digital certificate is the first certificate type. If the data amount of the first digital certificate is less than or equal to the data amount threshold, it is determined that the certificate type of the first digital certificate is the second certificate type. For example, the first digital certificate is the x509 digital certificate. FIG. 4 is a diagram of a principle of determining a certificate type. In FIG. 4, a non-quantum-resistant x509 digital certificate is the x509 digital certificate supporting the quantum-resistant algorithm, and a quantum-resistant x509 digital certificate is the x509 digital certificate that does not support the quantum-resistant algorithm. "A small certificate" indicates that the certificate type is the second certificate type, and "a large certificate" indicates that the certificate type is the first certificate type.

In this embodiment, in case of a large data amount, a data transmission time is increased. Therefore, when the data amount of the first digital certificate is greater than the data amount threshold, the first communication terminal returns the first digital certificate. The first digital certificate with a large data amount may be transmitted before the key negotiation, and is not transmitted during the key negotiation. In this way, a data transmission delay during the key negotiation is reduced, a key negotiation interrupt caused by a large transmission delay is reduced, a key negotiation success probability is increased, and the communication efficiency is improved.

In some embodiments, the network communication method further includes: receiving a response result without the first digital certificate returned by the second communication terminal when the data amount of the first digital certificate is less than or equal to the data amount threshold; transmitting a second key negotiation request to the first communication terminal in response to the response result; receiving the first digital certificate returned by the first communication terminal in response to the second key negotiation request; performing identity verification on the first communication terminal based on the received first digital certificate; generating the encrypted communication key when the identity verification succeeds; and performing encrypted communication with the first communication terminal based on the encrypted communication key.

The response result without the first digital certificate may be referred to as a second request response result. The second request response result does not carry the first digital certificate. The data amount of the digital certificate of the second certificate type is less than or equal to the data amount threshold.

Specifically, the first communication terminal returns the response result without the first digital certificate to the second communication terminal in response to the encrypted communication connection request when the data amount of the first digital certificate is less than or equal to the data amount threshold. For example, in response to the encrypted communication connection request, the first communication terminal transmits the second request response result for the encrypted communication connection to the second communication terminal when determining that the certificate type of the first digital certificate is the second certificate type. After receiving the second request response result, the second communication terminal transmits the second key negotiation request to the first communication terminal. The first communication terminal transmits the first digital certificate to the second communication terminal in response to the second key negotiation request. The second communication terminal performs identity verification on the first communication terminal through the first digital certificate, generates the encrypted communication key when the identity verification succeeds, and performs encrypted communication with the second communication terminal based on the encrypted communication key.

In some embodiments, the second communication terminal has a third digital certificate. The third digital certificate is used for identifying an identity of the second communication terminal. In the key negotiation stage, the first communication terminal may alternatively perform identity verification on the second communication terminal through the third digital certificate. Specifically, when a certificate type of the third digital certificate is the first certificate type, before the second communication terminal transmits the first key negotiation request to the first communication terminal, the second communication terminal may transmit the third digital certificate to the first communication terminal through the unencrypted communication link. After the second communication terminal transmits the first key negotiation request to the first communication terminal, the second communication terminal may further compress the third digital certificate to obtain a compressed certificate. For a compression process, refer to the process of compressing the first digital certificate, and for a process of obtaining the compressed certificate, refer to the process of obtaining the compressed digital certificate. The second communication terminal transmits the compressed certificate to the first communication terminal and generates a third random number, encrypts the third random number by using the first public key to obtain a third encrypted random number, and transmits the third encrypted random number to the first communication terminal. The first communication terminal performs consistency verification by using the compressed certificate, and performs identity verification on the second communication terminal after the consistency verification succeeds. Therefore, the first communication terminal performs identity verification on the second communication terminal, and the second communication terminal also performs identity verification on the first communication terminal. When the identity verification of the first communication terminal and the identity verification of the second communication terminal both succeed, the first communication terminal decodes the third encrypted random number by using the first private key to obtain the third random number, and generates the encrypted communication key based on the first random number, the second random number, and the third random number. The first communication terminal generates the encrypted communication key based on the first random number, the second random number, and the third random number.

In this embodiment, when the data amount of the first digital certificate is less than or equal to the data amount threshold, the first digital certificate is transmitted after the key negotiation is triggered by using the second key negotiation request. Therefore, in case of a relatively small data amount, the first digital certificate is directly transmitted in the key negotiation stage, and first transmitting the first digital certificate and then transmitting the compressed digital certificate are not required, which simplifies the transmission process, and avoids unnecessary data transmission, thereby improving the communication efficiency.

The network communication method provided in this application may be used for improving a transport layer security (TLS) or secure socket layer (SSL) connection establishment process, thereby improving efficiency of establishing the TLS or SSL connection. Both of the TLS and the SSL are encryption protocols for verifying a connection during data encryption and data transmission over the Internet. The TLS is an updated version of the SSL. The TLS fixes security vulnerabilities in the SSL protocol. Links established through the TLS and SSL connections are encrypted communication links. When the first digital certificate is the X.509 digital certificate supporting the quantum-resistant algorithm, the improved TLS protocol or SSL protocol may be referred to as a quantum-resistant algorithm TLS protocol or SSL protocol.

Figure 5:
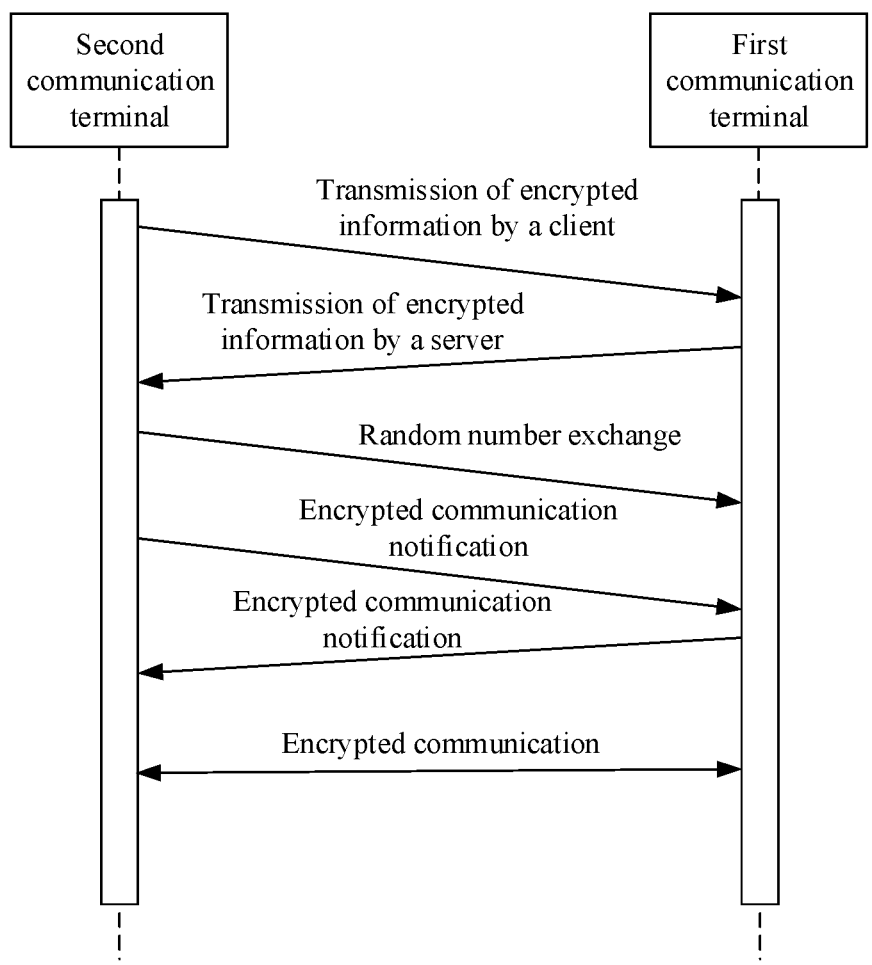
FIG. 5 is a timing diagram of a transport layer security (TLS) connection establishment process according to some embodiments.
Figure 6:
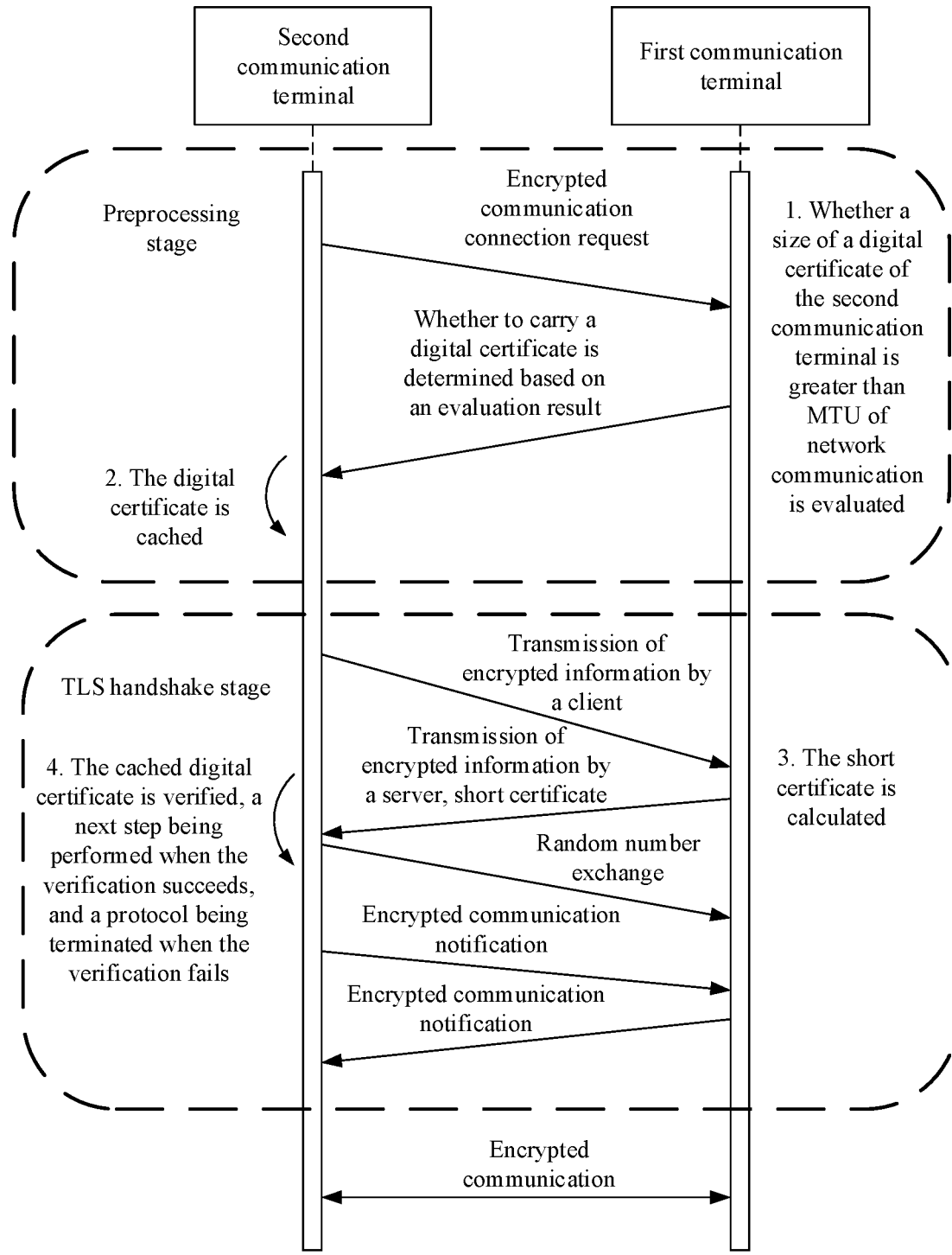
FIG. 6 is a timing diagram of an improved TLS connection establishment process according to some embodiments.

For example, the TLS or SSL connection establishment process is improved by using the network communication method provided in this application. FIG. 5 is a timing diagram of a TLS connection establishment process not improved by using the network communication method provided in this application, and FIG. 6 is a timing diagram of a TLS connection establishment process improved by using the network communication method provided in this application. In the TLS connection establishment process, the first communication terminal may be understood as a client, and the second communication terminal may be understood as a server side. The TLS connection establishment process is a key negotiation process, and may include but is not be limited to a Client Hello (transmission of encrypted information by the client) stage, a Server Hello (transmission of encrypted information by the server side) stage, a Client Key Exchange (random number exchange) stage, or a Change Cipher Spec (encrypted communication notification) stage. In the Client Hello stage, the second communication terminal transmits the key negotiation request to the first communication terminal. In the Server Hello stage, the second communication terminal caches the first digital certificate terminal to the second communication terminal. In the Client Key Exchange stage, the second communication terminal generates the third random number, encrypts the third random number by using the first public key, and transmits the encrypted third random number to the first communication terminal. The Change Cipher Spec stage is used for prompting data transmission by using the encrypted communication key.

It may be learned from FIG. 6 that the improved TLS connection establishment process includes a preprocessing stage and a TLS handshake stage, that is, the key negotiation stage. In the preprocessing stage, the second communication terminal transmits the encrypted communication connection request to the first communication terminal, and the first communication terminal determines whether to return the first digital certificate to the second communication terminal based on a size of the first digital certificate. The preprocessing stage may alternatively be referred to as a big data transmission stage.

Figure 7:
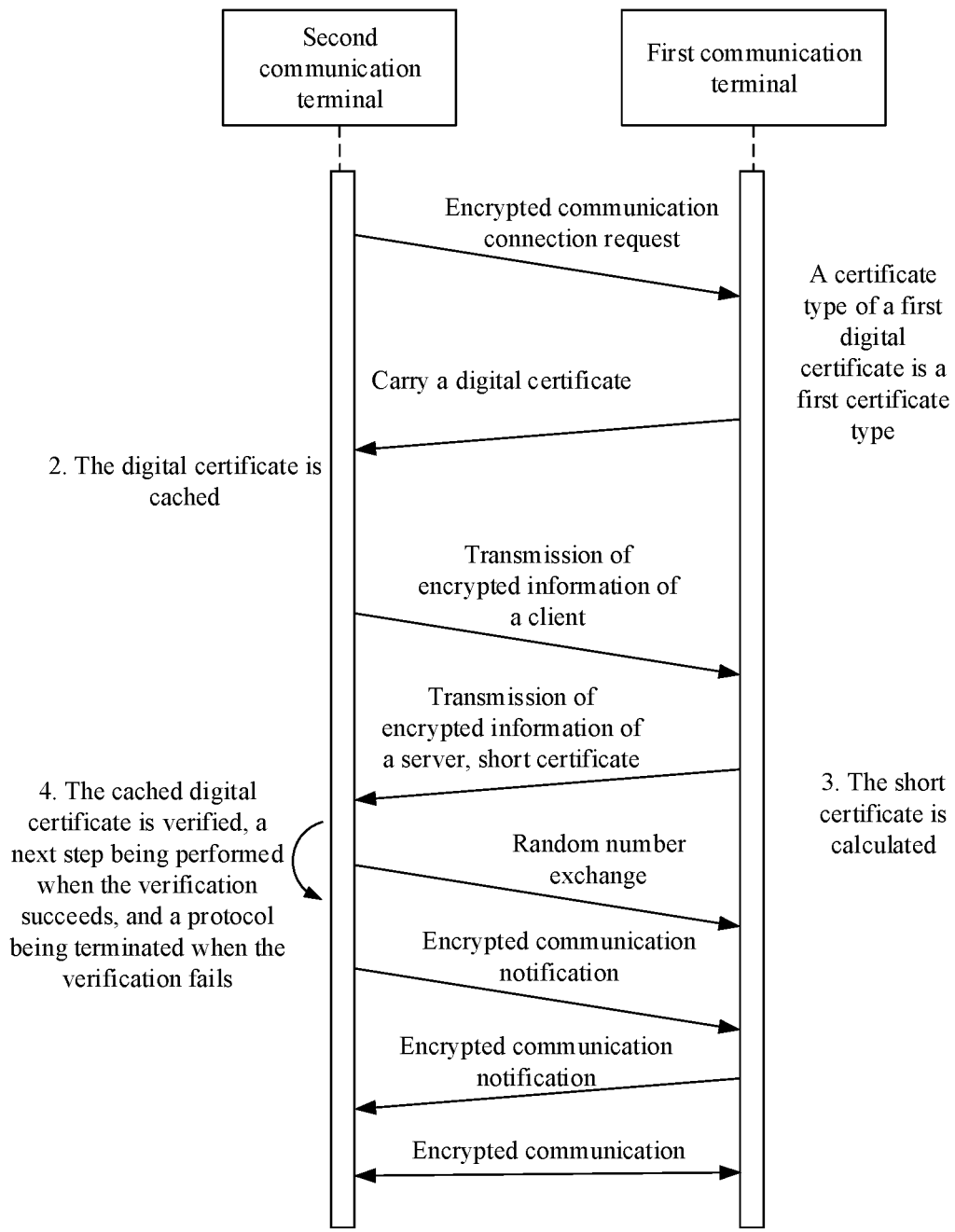
FIG. 7 is a timing diagram of an improved TLS connection establishment process according to some embodiments.

FIG. 7 is a timing diagram of an improved TLS connection establishment process when the certificate type of the first digital certificate is the first certificate type. In the preprocessing stage, when the certificate type of the first digital certificate is the first certificate type, the first communication terminal returns the first digital certificate to the second communication terminal, and the first communication terminal transmits the compressed digital certificate to the second communication terminal in Server Hello in the TLS handshake stage.

Figure 8:
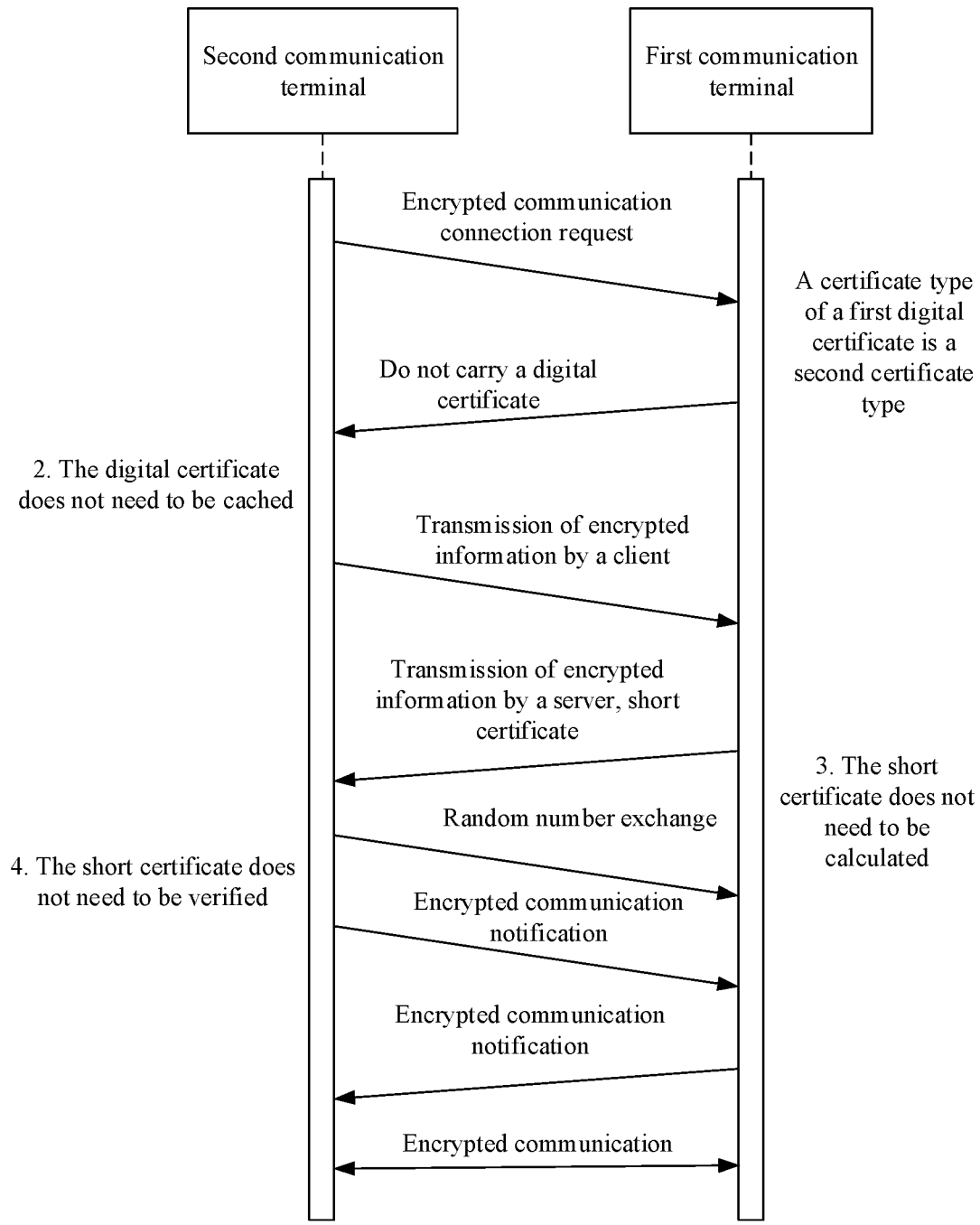
FIG. 8 is a timing diagram of an improved TLS connection establishment process according to some embodiments.

FIG. 8 is a timing diagram of an improved TLS connection establishment process when the certificate type of the first digital certificate is the second certificate type. In the preprocessing stage, when the certificate type of the first digital certificate is the second certificate type, the first communication terminal does not return the first digital certificate to the second communication terminal, but the first communication terminal transmits the first digital certificate to the second communication terminal in Server Hello in the TLS handshake stage. When the TLS handshake succeeds, that is, and the encrypted communication key is successfully negotiated, the first communication terminal and the second communication terminal perform encrypted communication.

In some embodiments, the first digital certificate includes a first content and content index information corresponding to the first content. The compressed digital certificate is obtained through compression of the first content in a preset compression manner. The execution of consistency verification on the second digital certificate and the compressed digital certificate includes: compressing a second content in the second digital certificate indicated through the content index information in the preset compression manner, to obtain a second compressed content; updating, in the second digital certificate, the second content to the second compressed content, to obtain a comparative digital certificate; performing consistency verification on the comparative digital certificate and the compressed digital certificate.

The content index information is index information for searching the first digital certificate for the first content. When the content in the first digital certificate is in a form of a key value pair, the content index information may include at least one key. The first content includes content values corresponding to the keys included in the content index information in the first digital certificate. The data amount of the compressed digital certificate is less than or equal to the data amount threshold. The first content is a part of the content in the first digital certificate. For example, when the first digital certificate is the digital certificate supporting the quantum-resistant algorithm, the first content may be a part or an entirety of the content in the first digital certificate supporting the quantum-resistant algorithm.

Specifically, the second communication terminal may compress the second content in the second digital certificate indicated through the content index information in the preset compression manner, to obtain the second compressed content, and then replaces the second content in the second digital certificate indicated through the content index information with the second compressed content, and determines the second digital certificate after the replacement as the comparative digital certificate. The second communication terminal compares the comparative digital certificate with the compressed digital certificate. When the comparative digital certificate is consistent with the compressed digital certificate, it is determined that the second digital certificate is consistent with the first digital certificate. The compressed digital certificate may be generated by the first communication terminal.

In some embodiments, the first communication terminal determines a first to-be-compressed content in the first digital certificate in response to the first key negotiation request transmitted by the second communication terminal, compresses the first content in the preset compression manner to obtain a first compressed content, and replaces the first content in the first digital certificate with the first compressed content. The first digital certificate after the replacement is the compressed digital certificate.

In this embodiment, the compressed digital certificate is obtained through compression of the first content in the first digital certificate. Therefore, only particular data in the first digital certificate is compressed, and not all data is compressed, which not only realizes compression, but also improves the compression efficiency.

In some embodiments, the first content is the content in the first digital certificate for supporting the quantum-resistant algorithm. The first digital certificate supports the quantum-resistant algorithm. The content index information is index information of the content supporting the quantum-resistant algorithm. The second communication terminal may compress the content in the second digital certificate supporting the quantum-resistant algorithm indicated through the content index information in the preset compression manner, to obtain the second compressed content.

The first digital certificate supports the quantum-resistant algorithm. The first digital certificate includes the content supporting the quantum-resistant algorithm. The first content index information is the index information of the content in the first digital certificate supporting the quantum-resistant algorithm.

Specifically, the content supporting the quantum-resistant algorithm may include at least one of the public key of the first communication terminal or a signature of the certificate issuer issuing the first digital certificate. The first content may include at least one of the public key of the first communication terminal or the signature of the certificate issuer issuing the first digital certificate. The content index information of the first content may include at least one of public key index information or signature index information. When the first content includes the public key of the first communication terminal and the signature of the certificate issuer issuing the first digital certificate, the second communication terminal may search the second digital certificate for at least one of the public key indicated in the public key index information and the signature indicated in the signature index information, and determine the found content as the content indicated in the content index information.

In some embodiments, the content index information may be transmitted by the first communication terminal to the second communication terminal. For example, the first communication terminal transmits the first request response result for the encrypted communication connection request to the second communication terminal in response to the encrypted communication connection request. The first request response result carries the content index information and the first digital certificate.

In this embodiment, since a data amount of the content supporting the quantum-resistant algorithm is relatively large, compressing the content supporting the quantum-resistant algorithm can effectively reduce the data amount and improve a compression effect.

Figure 9:
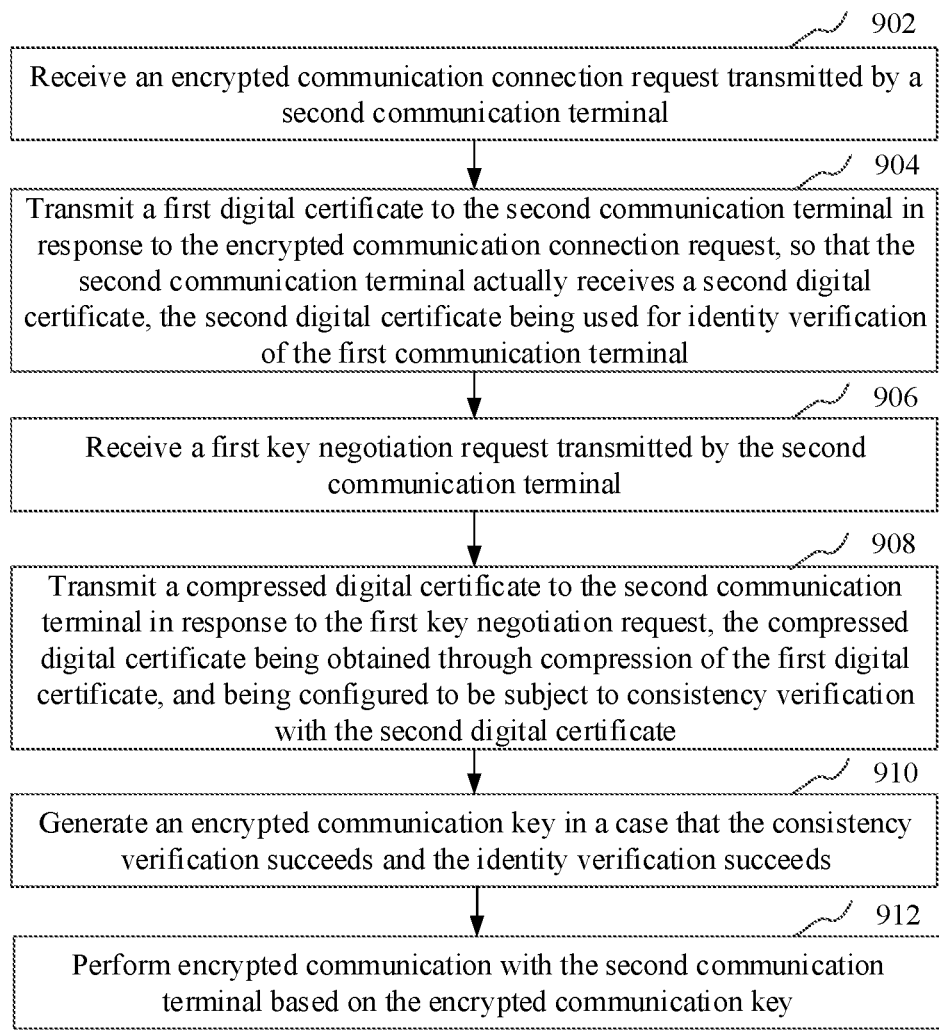
FIG. 9 is a schematic flowchart of a network communication method according to some embodiments.

In some embodiments, as shown in FIG. 9, a network communication method is provided. For example, the method is applied to the first communication terminal 102 in FIG. 1. The method includes the following steps:

Step 902: Receive an encrypted communication connection request transmitted by a second communication terminal.

The second communication terminal transmits the encrypted communication connection request to the first communication terminal to implement encrypted communication with the first communication terminal. In response to the encrypted communication connection request, the first communication terminal obtains a first digital certificate and transmits the first digital certificate to the second communication terminal.

Step 904: Transmit a first digital certificate to the second communication terminal in response to the encrypted communication connection request, so that the second communication terminal actually receives a second digital certificate, the second digital certificate being used for identity verification of the first communication terminal.

Specifically, in response to the encrypted communication connection request, the first communication terminal transmits the first digital certificate to the second communication terminal through an unencrypted communication link. The second communication terminal actually receives the second digital certificate.

Step 906: Receive a first key negotiation request transmitted by the second communication terminal.

Step 908: Transmit a compressed digital certificate to the second communication terminal in response to the first key negotiation request, the compressed digital certificate being obtained through compression of the first digital certificate, and being configured to be subject to consistency verification with the second digital certificate.

Specifically, after receiving the second digital certificate, the second communication terminal transmits the first key negotiation request to the first communication terminal. In response to the first key negotiation request, the second communication terminal a part or an entirety of a content in the first digital certificate to obtain the compressed digital certificate, and transmits the compressed digital certificate to the second communication terminal. The second communication terminal receives the compressed digital certificate returned by the first communication terminal, compresses the second digital certificate to obtain a comparative digital certificate, and performs consistency verification on the comparative digital certificate and the compressed digital certificate.

Step 910: Generate an encrypted communication key when the consistency verification succeeds and the identity verification of the first communication terminal succeeds.

Specifically, when the consistency verification succeeds, the second communication terminal may perform identity verification on the first communication terminal based on the second digital certificate. When the identity verification succeeds, the second communication terminal may transmit, to the first communication terminal, information indicating that the identity verification succeeds, to indicate that the first communication terminal and the second communication terminal may perform encrypted communication. When the consistency verification succeeds and the identity verification succeeds, the second communication terminal generates an encrypted communication key, and the second communication terminal may send a key generation request to the first communication terminal. The first communication terminal generates the encrypted communication key in response to the key generation request.

Step 912: Perform the encrypted communication with the second communication terminal based on the encrypted communication key.

Specifically, the encrypted communication key is a symmetric key. In other words, data encrypted through the encrypted communication key may be decrypted through the encrypted communication key. After the first communication terminal and the second communication terminal generate the encrypted communication key, data to be transmitted by the first communication terminal to the second communication terminal is encrypted by using the encrypted communication key, and data to be transmitted by the second communication terminal to the first communication terminal is also encrypted by using the encrypted communication key. After receiving the data encrypted by using the encrypted communication key transmitted by the second communication terminal, the first communication terminal decrypts the received data by using the encrypted communication key. After receiving the data encrypted by using the encrypted communication key transmitted by the first communication terminal, the second communication terminal decrypts the received data by using the encrypted communication key. In this way, the first communication terminal and the second communication terminal implement encrypted communication.

In the above network communication method, the encrypted communication connection request transmitted by the second communication terminal is received. In response to the encrypted communication connection request, the first digital certificate is transmitted to the second communication terminal, so that the second communication terminal actually receives the second digital certificate. The second digital certificate is used for the identity verification of the first communication terminal. The first key negotiation request transmitted by the second communication terminal is received. In response to the first key negotiation request, the compressed digital certificate is transmitted to the second communication terminal. The compressed digital certificate is obtained through compression of the first digital certificate, and is configured to be subject to consistency verification with the second digital certificate. When the consistency verification succeeds and the identity verification succeeds, the encrypted communication key is generated. The encrypted communication is performed with the second communication terminal based on the encrypted communication key. Since the first digital certificate is transmitted before the first key negotiation request is transmitted, that is, is transmitted before the key negotiation, and the compressed digital certificate corresponding to the first digital certificate is transmitted after the first key negotiation request is transmitted, that is, is transmitted during the key negotiation, and the first digital certificate is not transmitted during the key negotiation, an amount of data transmitted during the key negotiation is reduced, thereby reducing a key negotiation failure rate, and increasing a key negotiation success rate. In this way, efficiency of establishing the encrypted communication connection is improved, and the communication efficiency is improved.

In some embodiments, the transmission of the first digital certificate to the second communication terminal in response to the encrypted communication connection request includes: transmitting the first digital certificate to the second communication terminal in response to the encrypted communication connection request when a data amount of the first digital certificate is greater than a data amount threshold.

Specifically, when a certificate type of the first digital certificate is a first certificate type, a first request response result for the encrypted communication connection request is transmitted to the second communication terminal. The first request response result carries the first digital certificate. A data amount of a digital certificate of the first certificate type is greater than a data amount threshold. The second digital certificate is a digital certificate carried in the response result actually received by the second communication terminal after the first communication terminal returns the first request response result to the second communication terminal.

Specifically, the first communication terminal transmits the first request response result for the encrypted communication connection request to the second communication terminal through the unencrypted communication link in response to the encrypted communication connection request when the data amount of the first digital certificate is greater than the data amount threshold. Since the first request response result is transmitted by the first communication terminal through the unencrypted communication link, the response result actually received by the second communication terminal may be consistent or inconsistent with the first request response result.

In this embodiment, in case of a large data amount, a data transmission time is increased. Therefore, when the data amount of the first digital certificate is greater than the data amount threshold, the first communication terminal returns the first digital certificate. The first digital certificate with a large data amount may be transmitted before the key negotiation, and is not transmitted during the key negotiation. In this way, a data transmission delay during the key negotiation is reduced, a key negotiation interrupt caused by a large transmission delay is reduced, a key negotiation success probability is increased, and the communication efficiency is improved.

In some embodiments, it is determined that the data amount of the first digital certificate is greater than the data amount threshold when the certificate type of the first digital certificate is the first certificate type.

Specifically, when the certificate type of the first digital certificate is the first certificate type, the first communication terminal transmits the first request response result for the encrypted communication connection request to the second communication terminal through the unencrypted communication link. The first request response result carries the first digital certificate.

In this embodiment, whether the data amount of the first digital certificate is greater than the data amount threshold is determined based on the certificate type, which improves efficiency of determining whether the data amount of the first digital certificate is greater than the data amount threshold.

In some embodiments, a response result without the first digital certificate is returned to the second communication terminal in response to the encrypted communication connection request when the data amount of the first digital certificate is less than or equal to the data amount threshold. A second key negotiation request transmitted by the second communication terminal is received, and the first digital certificate is transmitted to the second communication terminal in response to the second key negotiation request. The second key negotiation request is returned by the second communication terminal in response to the response result without the first digital certificate. The first digital certificate is used for identity verification of the first communication terminal by the second communication terminal. The encrypted communication key is generated when the identity verification succeeds, and the encrypted communication is performed with the second communication terminal based on the encrypted communication key.

Specifically, the response result without the first digital certificate may be referred to as a second request response result. The second request response result is used for triggering the second communication terminal to transmit the second key negotiation request to the first communication terminal. The first communication terminal transmits the first digital certificate to the second communication terminal in response to the second key negotiation request. When the second communication terminal receives the first digital certificate, the second communication terminal performs identity verification on the first communication terminal based on the first digital certificate, generates the encrypted communication key when the identity verification succeeds, and transmits the key generation request to the first communication terminal. The first communication terminal generates the encrypted communication key in response to the key generation request. The first communication terminal and the second communication terminal perform the encrypted communication based on the encrypted communication key.

In this embodiment, when the data amount of the first digital certificate is less than or equal to the data amount threshold, the first digital certificate is transmitted after the key negotiation is triggered through the second key negotiation request. Therefore, in case of a relatively small data amount, the first digital certificate is directly transmitted in the key negotiation stage, which ensures security of data transmission, reduces negotiation failures caused by transmission of a large amount of data, and improves communication efficiency.

In some embodiments, the method further includes: determining that the data amount of the first digital certificate is less than or equal to the data amount threshold when the certificate type of the first digital certificate is a second certificate type.

In this embodiment, whether the data amount of the first digital certificate is greater than the data amount threshold is determined based on the certificate type, which improves efficiency of determining whether the data amount of the first digital certificate is greater than the data amount threshold.

In some embodiments, the transmission of the compressed digital certificate to the second communication terminal in response to the first key negotiation request includes: determining a first content from the first digital certificate in response to the first key negotiation request; compressing the first content in a preset compression manner, to obtain a first compressed content; updating, in the first digital certificate, the first content to the first compressed content, to obtain the compressed digital certificate; transmitting the compressed digital certificate to the second communication terminal.

The first content may be any part of a content in the first digital certificate. A data amount of the compressed digital certificate is less than or equal to the data amount threshold.

Specifically, the first communication terminal determines a first to-be-compressed content from the first digital certificate in response to the first key negotiation request, compresses the first content in the preset compression manner to obtain a first compressed content, then updates the first content in the first digital certificate to the first compressed content, to obtain the compressed digital certificate, and transmits the compressed digital certificate to the second communication terminal.

In this embodiment, the compressed digital certificate is obtained through compression of the first content in the first digital certificate, which not only realizes data compression, but also improves the compression efficiency.

In some embodiments, the first digital certificate supports a quantum-resistant algorithm. The determining a first content from the first digital certificate includes: obtaining a content for supporting the quantum-resistant algorithm in the first digital certificate, to obtain the first content.

The first digital certificate supports the quantum-resistant algorithm. The first digital certificate includes the content supporting the quantum-resistant algorithm. The first content index information is the index information of the content in the first digital certificate supporting the quantum-resistant algorithm.

Specifically, the content supporting the quantum-resistant algorithm may include at least one of a public key of the first communication terminal or a signature of a certificate issuer issuing the first digital certificate. The first content may include at least one of the public key of the first communication terminal or a signature of a certificate issuer issuing the second digital certificate. Content index information of the first content may include at least one of public key index information or signature index information.

In some embodiments, the first communication terminal obtains the content supporting the quantum-resistant algorithm from the first digital certificate in response to the first key negotiation request transmitted by the second communication terminal, to obtain the first content.

In this embodiment, since a data amount of the content supporting the quantum-resistant algorithm is relatively large, compressing the content supporting the quantum-resistant algorithm can effectively reduce the data amount and improve a compression effect.

Figure 10:
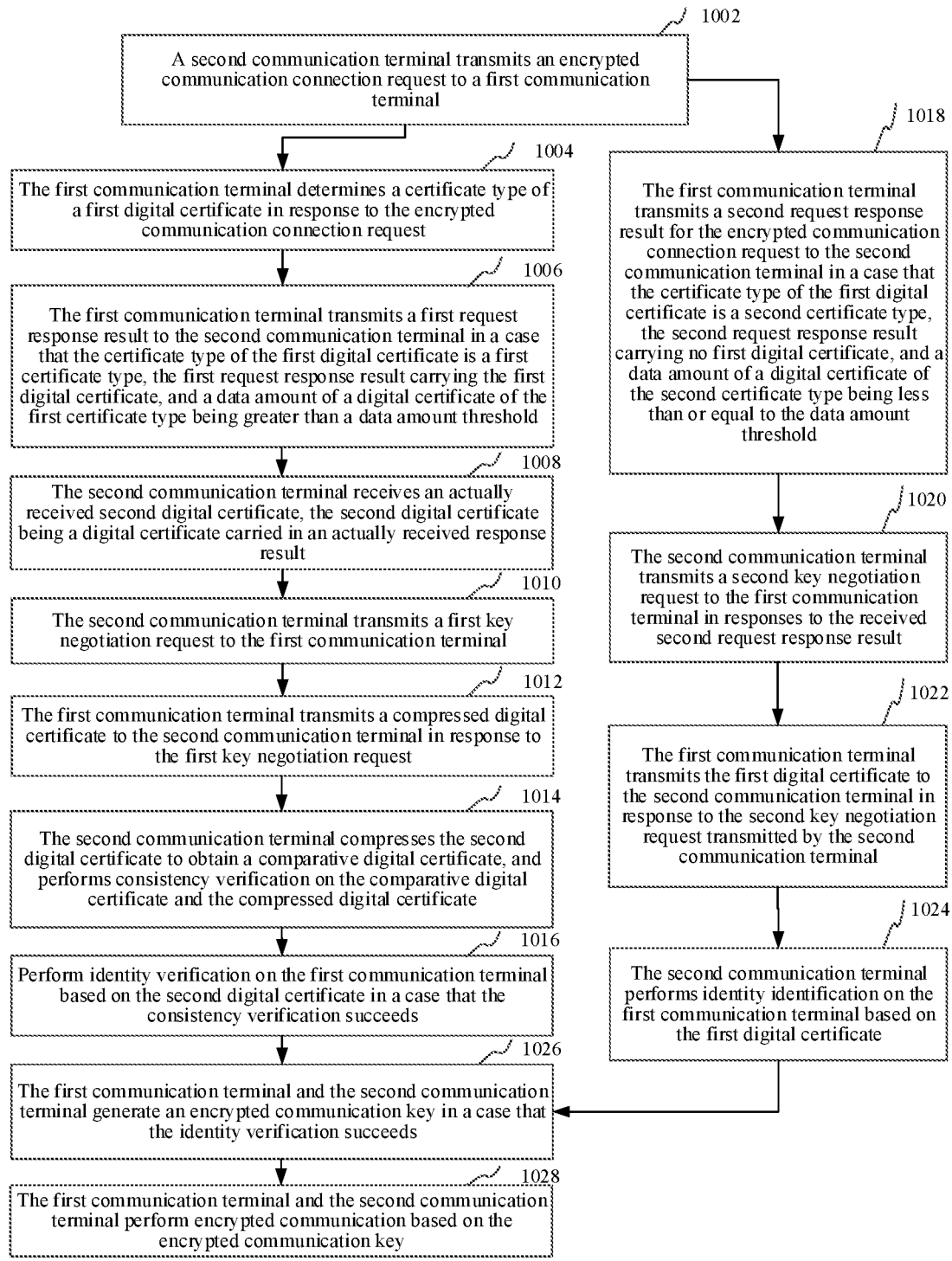
FIG. 10 is a schematic flowchart of a network communication method according to some embodiments.

In some embodiments, as shown in FIG. 10, a network communication method is provided. For example, the method is applied to a first communication terminal and a second communication terminal. The method includes the following steps:

Step 1002: The second communication terminal transmits an encrypted communication connection request to the first communication terminal.

Step 1004: The first communication terminal determines a certificate type of a first digital certificate in response to the encrypted communication connection request.

Step 1006: The first communication terminal transmits a first request response result to the second communication terminal when the certificate type of the first digital certificate is a first certificate type, the first request response result carrying the first digital certificate, and a data amount of a digital certificate of the first certificate type being greater than a data amount threshold.

Step 1008: The second communication terminal receives an actually received second digital certificate, the second digital certificate being a digital certificate carried in an actually received response result.

Step 1010: The second communication terminal transmits a first key negotiation request to the first communication terminal.

The first key negotiation request carries a first random number.

Step 1012: The first communication terminal transmits a compressed digital certificate to the second communication terminal in response to the first key negotiation request.

The compressed digital certificate is obtained through compression of the first digital certificate.

Step 1014: The second communication terminal compresses the second digital certificate to obtain a comparative digital certificate, and performs consistency verification on the comparative digital certificate and the compressed digital certificate.

Step 1016: Perform identity verification on the first communication terminal based on the second digital certificate when the consistency verification succeeds.

Step 1018: The first communication terminal transmits a second request response result for the encrypted communication connection request to the second communication terminal when the certificate type of the first digital certificate is a second certificate type, the second request response result carrying no first digital certificate, and a data amount of a digital certificate of the second certificate type being less than or equal to the data amount threshold.

A second key negotiation request carries the first random number.

Step 1020: The second communication terminal transmits a second key negotiation request to the first communication terminal in responses to the received second request response result.

Step 1022: The first communication terminal transmits the first digital certificate to the second communication terminal in response to the second key negotiation request transmitted by the second communication terminal.

Step 1024: The second communication terminal performs identity identification on the first communication terminal based on the first digital certificate.

Step 1026: The first communication terminal and the second communication terminal generate an encrypted communication key when the identity verification succeeds.

Step 1028: The first communication terminal and the second communication terminal perform encrypted communication based on the encrypted communication key.

In this embodiment, when the certificate type of the first digital certificate is the first certificate type, a complete digital certificate is transmitted before the key negotiation, and the compressed digital certificate is transmitted during the key negotiation. Therefore, an amount of data transmitted during the key negotiation is reduced in case of a relatively large data certificate. When the certificate type of the first digital certificate is the second certificate type, the complete digital certificate is transmitted during the key negotiation, that is, the complete digital certificate is transmitted during the key negotiation in case of a relatively small data certificate, thereby reducing a key negotiation failure rate, and increasing a key negotiation success rate. In this way, efficiency of establishing the encrypted communication connection is improved, and the communication efficiency is improved.

It is to be understood that, although the steps are displayed sequentially according to the instructions of the arrows in the flowcharts of the embodiments, these steps are not necessarily performed sequentially according to the sequence indicated through the arrows. Unless otherwise explicitly specified in this application, execution of the steps is not strictly limited, and the steps may be performed in another sequence. Moreover, at least some of the steps in each embodiment may include a plurality of steps or a plurality of stages. The steps or stages are not necessarily performed at the same moment but may be performed at different moments. Execution of the steps or stages is not necessarily sequentially performed, but may be performed alternately with other steps or at least some of steps or stages of other steps.

Based on the same inventive concept, an embodiment of this application further provides a network communication apparatus for implementing the above network communication method. The implementation of the provided apparatus for resolving the problem is similar to the implementation described in the above method. Therefore, for specific limitations in one or more network communication apparatus embodiments provided below, refer to the limitations of the above network communication method. The details are not described herein.

Figure 11:
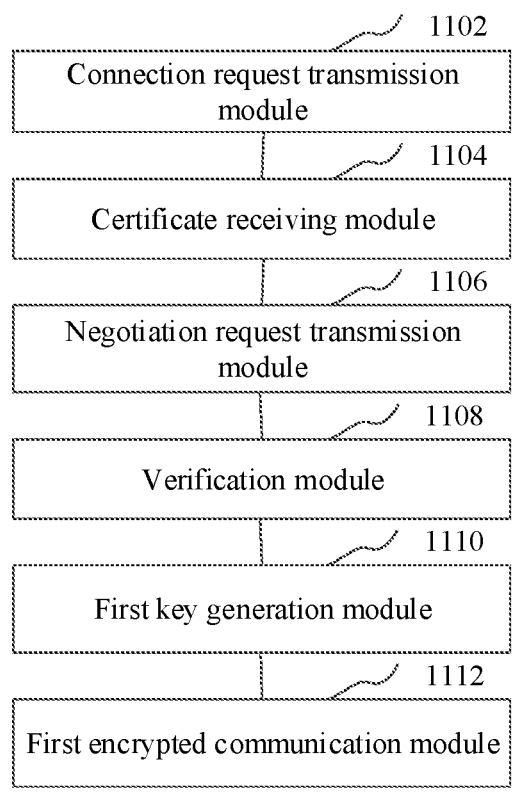
FIG. 11 is a structural block diagram of a network communication apparatus according to some embodiments.

In some embodiments, as shown in FIG. 11, a network communication apparatus is provided, including a connection request transmission module 1102, a certificate receiving module 1104, a negotiation request transmission module 1106, a verification module 1108, a first key generation module 1110, and a first encrypted communication module 1112.

The connection request transmission module 1102 is configured to transmit an encrypted communication connection request to a first communication terminal, the encrypted communication connection request indicating that the first communication terminal needs to return a first digital certificate.

The certificate receiving module 1104 is configured to receive a second digital certificate from the first communication terminal, the second digital certificate being a digital certificate actually received by the second communication terminal after the first communication terminal returns the first digital certificate in response to the encrypted communication connection request.

The negotiation request transmission module 1106 is configured to: transmit a first key negotiation request to the first communication terminal, and receive a compressed digital certificate returned by the first communication terminal in response to the first key negotiation request. The compressed digital certificate is obtained through compression of the first digital certificate.

The verification module 1108 is configured to perform consistency verification on the second digital certificate and the compressed digital certificate.

The first key generation module 1110 is configured to generate an encrypted communication key when the consistency verification succeeds and identity verification of the first communication terminal based on the second digital certificate succeeds.

The first encrypted communication module 1112 is configured to perform encrypted communication with the first communication terminal based on the encrypted communication key.

In some embodiments, the first digital certificate is returned by the first communication terminal in response to the encrypted communication connection request when the data amount of the first digital certificate is greater than the data amount threshold.

In some embodiments, the apparatus is further configured to: receive a response result without the first digital certificate returned by the second communication terminal when the data amount of the first digital certificate is less than or equal to the data amount threshold; transmit a second key negotiation request to the first communication terminal in response to the response result; receive the first digital certificate returned by the first communication terminal in response to the second key negotiation request; perform identity verification on the first communication terminal based on the received first digital certificate; generate the encrypted communication key when the identity verification succeeds; and perform encrypted communication with the first communication terminal based on the encrypted communication key.

In some embodiments, the first digital certificate includes a first content and content index information corresponding to the first content. The compressed digital certificate is obtained through compression of the first content in a preset compression manner. The verification module 1108 is further configured to: compress a second content in the second digital certificate indicated through the content index information in the preset compression manner, to obtain a second compressed content; update, in the second digital certificate, the second content to the second compressed content, to obtain a comparative digital certificate; and perform consistency verification on the comparative digital certificate and the compressed digital certificate.

In some embodiments, the first digital certificate supports a quantum-resistant algorithm, the first content being a content in the first digital certificate for supporting the quantum-resistant algorithm.

Figure 12:
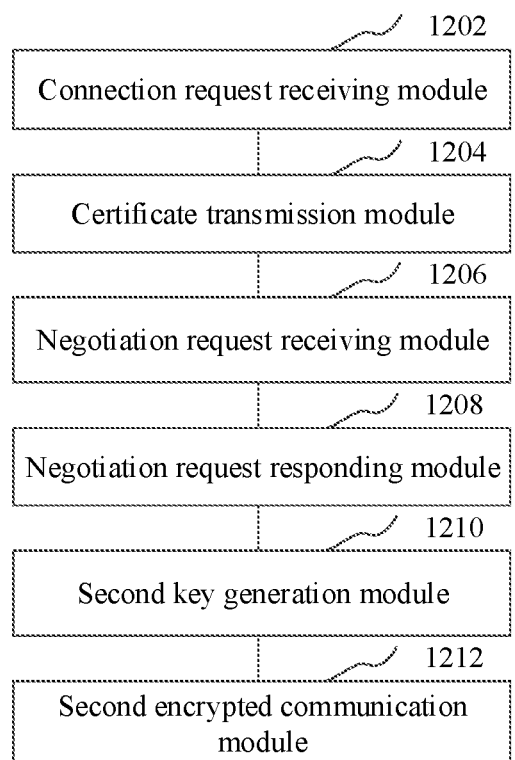
FIG. 12 is a structural block diagram of a network communication apparatus according to some embodiments.

In some embodiments, as shown in FIG. 12, a network communication apparatus is provided, including a connection request receiving module 1202, a certificate transmission module 1204, a negotiation request receiving module 1206, a negotiation request responding module 1208, a second key generation module 1210, and a second encrypted communication module 1212.

The connection request receiving module 1202 is configured to receive an encrypted communication connection request transmitted by a second communication terminal.

The certificate transmission module 1204 is configured to transmit a first digital certificate to the second communication terminal in response to the encrypted communication connection request, so that the second communication terminal actually receives a second digital certificate, the second digital certificate being used for identity verification of the first communication terminal.

The negotiation request receiving module 1206 is configured to receive a first key negotiation request transmitted by the second communication terminal.

The negotiation request responding module 1208 is configured to transmit a compressed digital certificate to the second communication terminal in response to the first key negotiation request, the compressed digital certificate being obtained through compression of the first digital certificate, and being configured to be subject to consistency verification with the second digital certificate.

The second key generation module 1210 is configured to generate an encrypted communication key when the consistency verification succeeds and the identity verification succeeds.

The second encrypted communication module 1212 is configured to perform encrypted communication with the second communication terminal based on the encrypted communication key.

In some embodiments, the certificate transmission module 1204 is further configured to transmit the first digital certificate to the second communication terminal in response to the encrypted communication connection request when a data amount of the first digital certificate is greater than a data amount threshold.

In some embodiments, the apparatus is further configured to determine that the data amount of the first digital certificate is greater than the data amount threshold when a certificate type of the first digital certificate is a first certificate type.

In some embodiments, the apparatus is further configured to: receive a second key negotiation request transmitted by the second communication terminal, and transmit the first digital certificate to the second communication terminal in response to the second key negotiation request, the second key negotiation request being returned by the second communication terminal in response to the response result without the first digital certificate, and the first digital certificate being used for identity verification of the first communication terminal by the second communication terminal; and perform encrypted communication with the second communication terminal based on the encrypted communication key. The apparatus is further configured to: return a response result without the first digital certificate to the second communication terminal in response to the encrypted communication connection request when the data amount of the first digital certificate is less than or equal to the data amount threshold; receive a second key negotiation request transmitted by the second communication terminal, and transmit the first digital certificate to the second communication terminal in response to the second key negotiation request, the second key negotiation request being returned by the second communication terminal in response to the response result without the first digital certificate, and the first digital certificate being used for identity verification of the first communication terminal by the second communication terminal; and generate the encrypted communication key and perform encrypted communication with the second communication terminal based on the encrypted communication key when the identity verification succeeds.

In some embodiments, the apparatus is further configured to determine that the data amount of the first digital certificate is less than or equal to the data amount threshold when the certificate type of the first digital certificate is a second certificate type.

In some embodiments, the negotiation request responding module 1208 is further configured to: determine a first content from the first digital certificate in response to the first key negotiation request; compress the first content in a preset compression manner, to obtain a first compressed content; update, in the first digital certificate, the first content to the first compressed content, to obtain the compressed digital certificate; transmit the compressed digital certificate to the second communication terminal.

In some embodiments, the first digital certificate supports a quantum-resistant algorithm. The negotiation request responding module 1208 is further configured to obtain a content for supporting the quantum-resistant algorithm from the first digital certificate, to obtain the first content.

All or some of modules in the network communication apparatus may be implemented by software, hardware, or a combination thereof. The above modules may be built in or independent of a processor of a computer device in a form of hardware, or may be stored in a memory of the computer device in a form of software, so that the processor invokes and performs an operation corresponding to each of the modules.

In some embodiments, a computer device is provided. The computer device may be a server. An internal structure diagram of the computer device may be shown in FIG. 13. The computer device includes a processor, a memory, an input/output (I/O for short) interface, and a communication interface. The processor, the memory, and the I/O interface are connected through a system bus, and the communication interface is connected to the system bus through the I/O interface. The processor of the computer device is configured to provide computing and control capabilities. The memory of the computer device includes a non-transitory storage medium and an internal memory. The non-transitory storage medium stores an operating system, a computer program, and a database. The internal memory provides an environment for running of the operating system and the computer program in the non-transitory computer-readable storage medium. The database of the computer device is configured to store the data in the network communication method. The I/O interface of the computer device is configured for information exchange between the processor and the external device. The communication interface of the computer device is configured to connect and communicate with an external terminal through a network. The computer program, when executed by the processor, implements the network communication method.

In some embodiments, a computer device is provided. The computer device may be a terminal, and an internal structure diagram of the computer device may be shown in FIG. 14. The computer device includes a processor, a memory, an I/O interface, a communication interface, a display unit, and an input apparatus. The processor, the memory, and the I/O interface are connected through a system bus. The communication interface, the display unit, and the input apparatus are connected to the system bus through the I/O interface. The processor of the computer device is configured to provide computing and control capabilities. The memory of the computer device includes a non-transitory storage medium and an internal memory. The non-transitory storage medium stores an operating system and a computer program. The internal memory provides an environment for running of the operating system and the computer program in the non-transitory computer-readable storage medium. The I/O interface of the computer device is configured for information exchange between the processor and the external device. The communication interface of the computer device is used for wired or wireless communication with an external terminal. The wireless communication may be implemented by Wi-Fi, a mobile cellular network, near field communication (NFC), or another technology. The computer program, when executed by the processor, implements the network communication method. The display unit of the computer device is configured to form a visually visible picture, and may be a display screen, a projection apparatus, or a virtual reality imaging apparatus. The display screen may be a liquid crystal display screen or an electronic ink display screen. The input apparatus of the computer device may be a touch layer covering the display screen, or may be a button, a trackball, or a touchpad disposed on a housing of the computer device, or may be an external keyboard, touchpad, a mouse, or the like.

Figure 13:
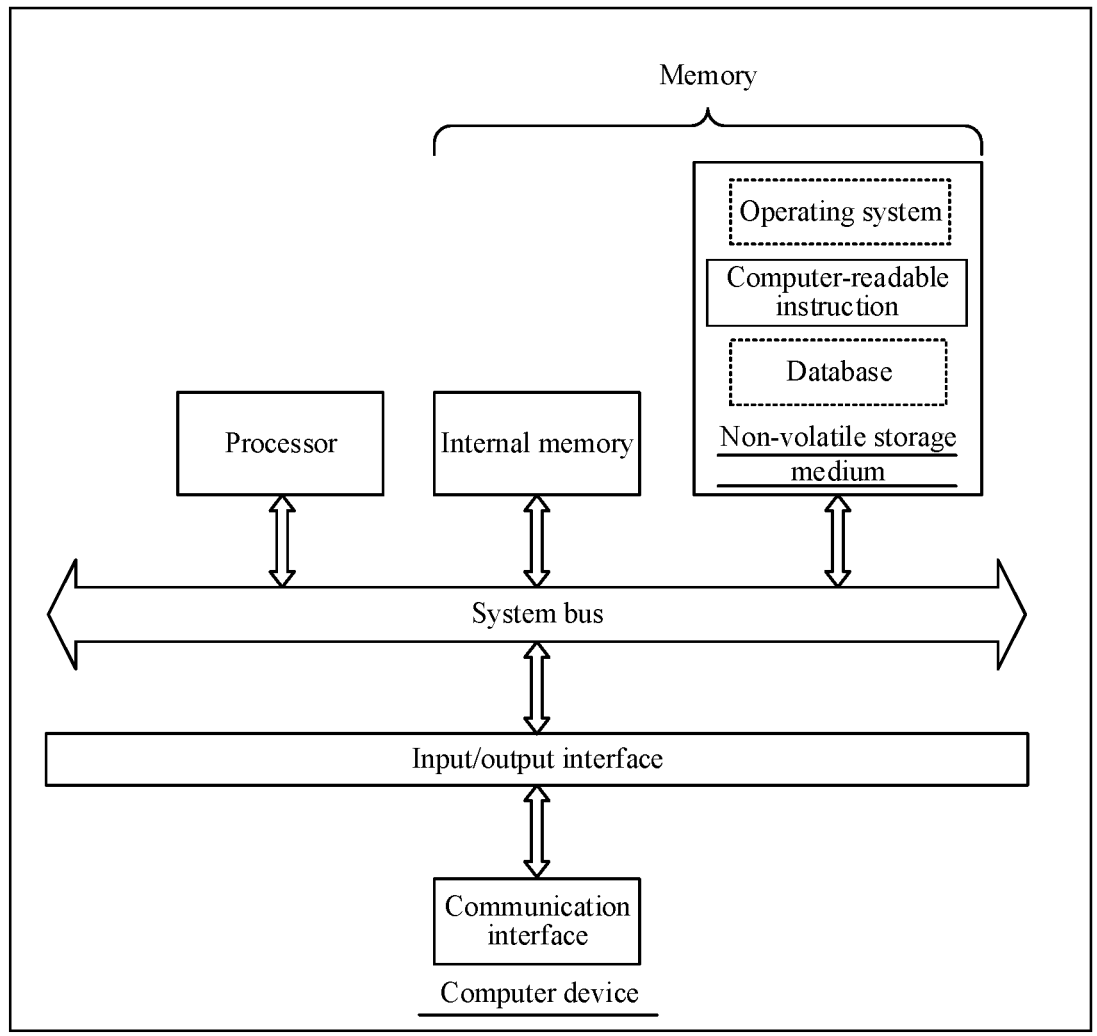
FIG. 13 is a diagram of an internal structure of a computer device according to some embodiments.
Figure 14:
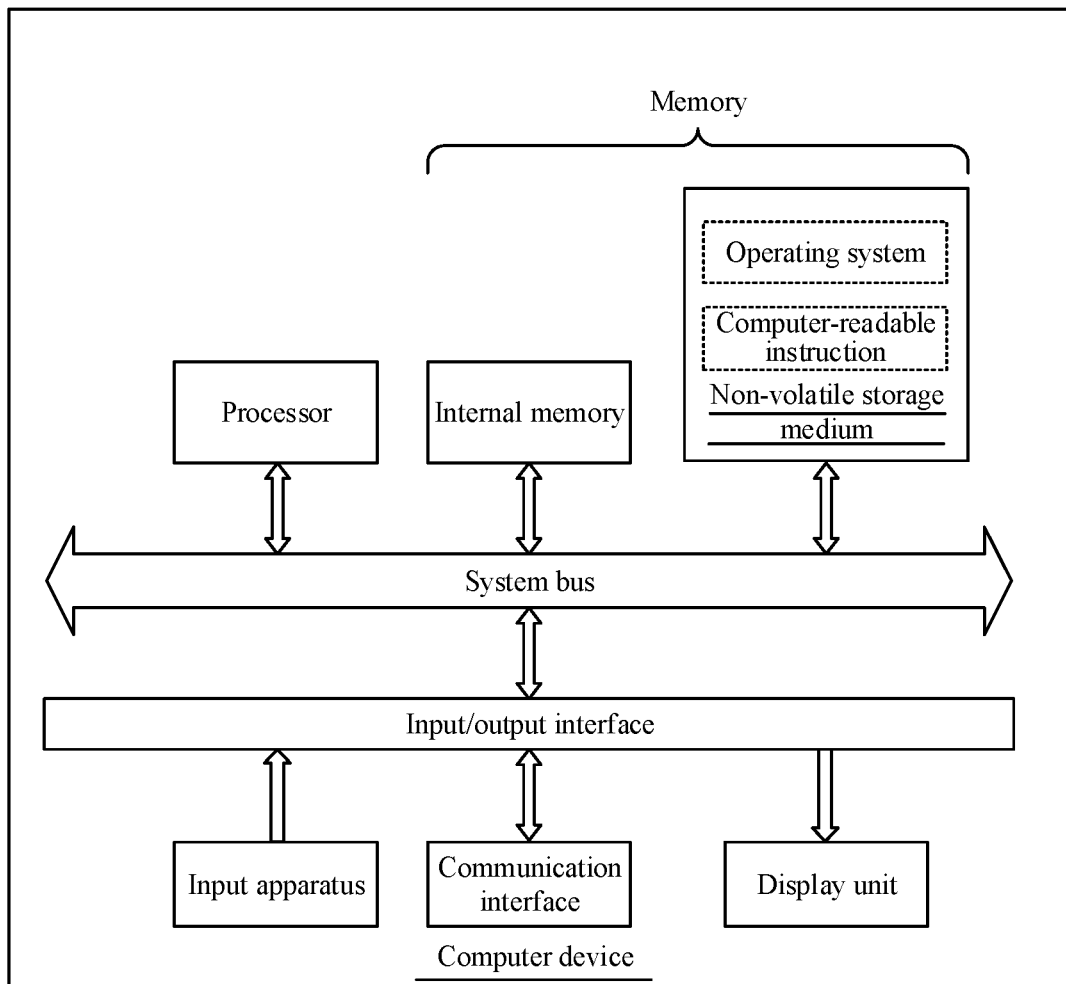
FIG. 14 is a diagram of an internal structure of a computer device according to some embodiments.

A person skilled in the art may understand that, FIG. 13 and FIG. 14 are merely block diagrams of partial structures related to the solution of this application, and do not constitute a limitation to the computer device to which the solution of this application is applied. Specifically, the computer device may include more components or fewer components than those shown in the figure, or some components may be combined, or a different component arrangement may be used.

In some embodiments, a computer device is further provided, including a memory and one or more processors, the memory storing computer-readable instructions, and the processor implementing the operations of the above network communication method when executing the computer-readable instructions.

In some embodiments, one or more computer-readable storage media are provided, storing computer-readable instructions, the computer-readable instructions, when executed by a processor, implementing the operations of the above network communication method.

In some embodiments, a computer program product is provided, including computer-readable instructions, the computer-readable instructions, when executed by one or more processors, implementing the operations of the above network communication method.

The user information (including but not limited to user device information and user personal information) and data (including but not limited to data for analysis, stored data, and displayed data) in this application are all authorized by the user or are information and data fully authorized by all parties, and collection, use, and processing of relevant data need to comply with relevant laws, regulations, and standards of relevant countries and regions.

A person of ordinary skill in the art may understand that all or some process of the method in the above embodiments may be implemented by instructing relevant hardware through a computer program. The computer program may be stored in a non-transitory computer-readable storage medium. When the computer program is executed, the processes of the above method embodiments may be included. Any reference to a memory, a database, or another medium used in the embodiments provided in this application may include at least one of a non-transitory memory and a volatile memory. The non-transitory memory may include a read-only memory (ROM) a magnetic tape, a floppy disk, a flash memory, an optical memory, a high density embedded non-transitory memory, a resistive memory (ReRAM), a magnetoresistive random access memory (MRAM), a magnetoresistive random access memory (FRAM), a phase change memory (PCM), a graphene memory, and the like. The non-transitory memory may include a random access memory (RAM) an external cache, or the like. For description instead of limitation, the RAM is available in a plurality of forms, such as a static RAM (SRAM) or a dynamic RAM (DRAM). The databases in the embodiments provided in this application may include at least one of a relational database and a non-relational database. The non-relational database may include a block-chain-based distributed database, but is not limited thereto. The processor in the embodiments provided in this application may be a general purpose processor, a central processing unit, a graphics processing unit, a digital signal processor, a programmable logic device, a data processing logic device based on quantum computing, and the like, but is not limited thereto.

Technical features of the above embodiments may be randomly combined. To make description concise, not all possible combinations of the technical features in the above embodiments are described. However, the combinations of these technical features are considered to fall within the scope recorded in this specification provided that no conflict exists.

The above embodiments are only some implementations of this application and are described in detail, which, however, are not to be construed as a limitation on the patent scope of this application. It is to be understood that a person of ordinary skill in the art may make transformations and improvements without departing from the idea of this application. These transformations and improvements fall within the protection scope of this application. Therefore, the protection scope of this application is subject to the appended claims.

What is claimed is:

1. A network communication method performed by a computer device acting as a second communication terminal, the method comprising:

transmitting an encrypted communication connection request for a first digital certificate to a first communication terminal;

receiving a second digital certificate from the first communication terminal, the second digital certificate being a short version of the first digital certificate actually received by the second communication terminal from the first communication terminal in response to the encrypted communication connection request, wherein the first digital certificate comprises a first content and content index information corresponding to the first content;

receiving a third digital certificate returned by the first communication terminal in response to a first key negotiation request transmitted to the first communication terminal, the third digital certificate being a compressed digital certificate generated by the first communication terminal through compression of the first content in the first digital certificate in a preset compression manner;

performing consistency verification on the second digital certificate and the compressed digital certificate, further including:

compressing a second content in the second digital certificate indicated through the content index information in the preset compression manner, to obtain a second compressed content;

updating, in the second digital certificate, the second content with the second compressed content, to obtain a comparative digital certificate; and performing consistency verification on the comparative digital certificate and the compressed digital certificate;

determining that the consistency verification succeeds and identity verification of the first communication terminal based on the second digital certificate succeeds;

generating an encrypted communication key; and performing encrypted communication with the first communication terminal based on the encrypted communication key.

2. The method according to claim 1, wherein the first digital certificate is returned by the first communication terminal in response to the encrypted communication connection request when a data amount of the first digital certificate is greater than a data amount threshold.

3. The method according to claim 2, further comprising:

determining that the data amount of the first digital certificate is less than or equal to the data amount threshold;

transmitting a second key negotiation request to the first communication termina;

receiving the first digital certificate returned by the first communication terminal in response to the second key negotiation request;

performing identity verification on the first communication terminal based on the received first digital certificate;

generating the encrypted communication key when the identity verification succeeds; and performing encrypted communication with the first communication terminal based on the encrypted communication key.

4. The method according to claim 1, wherein the first content in the first digital certificate supports a quantum-resistant algorithm.

5. A network communication method performed by a computer device acting as a first communication terminal, the method comprising:
- receiving an encrypted communication connection request for a first digital certificate transmitted by a second communication terminal;
- transmitting a short version of the first digital certificate to the second communication terminal as a second digital certificate in response to the encrypted communication connection request, wherein the first digital certificate comprises a first content and content index information corresponding to the first content;
- receiving a first key negotiation request transmitted by the second communication terminal;
- transmitting a third digital certificate to the second communication terminal in response to the first key negotiation request, wherein the third digital certificate is a compressed digital certificate generated by the first communication terminal through compression of the first content in the first digital certificate in a preset compression manner and the second communication terminal performs consistency verification on the second digital certificate and the compressed digital certificate, wherein the transmitting the compressed digital certificate further comprises:
- determining the first content from the first digital certificate in response to the first key negotiation request;
- compressing the first content in the preset compression manner, to obtain a first compressed content;
- updating, in the first digital certificate, the first content to the first compressed content, to obtain the compressed digital certificate; and
- transmitting the compressed digital certificate to the second communication terminal;
- determining that the consistency verification succeeds and the identity verification succeeds;
- generating an encrypted communication key; and
- performing encrypted communication with the second communication terminal based on the encrypted communication key.

6. The method according to claim 5, wherein the transmitting a first digital certificate to the second communication terminal in response to the encrypted communication connection request comprises:
- determining that a data amount of the first digital certificate is greater than a data amount threshold; and
- transmitting the first digital certificate to the second communication terminal in response to the encrypted communication connection request.

7. The method according to claim 6, the method further comprises:
- determining that the data amount of the first digital certificate is greater than the data amount threshold after determining that a certificate type of the first digital certificate is a first certificate type.

8. The method according to claim 5, further comprising:
- in response to the encrypted communication connection request, returning a response result without the first digital certificate to the second communication terminal when the data amount of the first digital certificate is less than or equal to the data amount threshold;
- transmitting the first digital certificate to the second communication terminal in response to a second key negotiation request transmitted by the second communication terminal, wherein the second key negotiation request is returned by the second communication terminal in response to the response result without the first digital certificate; and
- generating the encrypted communication key and performing encrypted communication with the second communication terminal based on the encrypted communication key when the identity verification succeeds.

9. The method according to claim 8, further comprising:
- determining that the data amount of the first digital certificate is less than or equal to the data amount threshold after determining that the certificate type of the first digital certificate is a second certificate type.

10. The method according to claim 5, wherein the determining a first content from the first digital certificate comprises:
- obtaining a content for supporting a quantum-resistant algorithm from the first digital certificate as the first content.

11. A computer device acting as a second communication terminal, comprising a memory and one or more processors, the memory storing computer-readable instructions, and the processor, when executing the computer-readable instructions, causing the computer device to implement a network communication method including:
- transmitting an encrypted communication connection request for a first digital certificate to a first communication terminal;
- receiving a second digital certificate from the first communication terminal, the second digital certificate being a short version of the first digital certificate actually received by the second communication terminal from the first communication terminal in response to the encrypted communication connection request, wherein the first digital certificate comprises a first content and content index information corresponding to the first content;
- receiving a third digital certificate returned by the first communication terminal in response to a first key negotiation request transmitted to the first communication terminal, the third digital certificate being a compressed digital certificate generated by the first communication terminal through compression of the first content in the first digital certificate in a preset compression manner;
- performing consistency verification on the second digital certificate and the compressed digital certificate, further including:
  - compressing a second content in the second digital certificate indicated through the content index information in the preset compression manner, to obtain a second compressed content;
  - updating, in the second digital certificate, the second content with the second compressed content, to obtain a comparative digital certificate; and
  - performing consistency verification on the comparative digital certificate and the compressed digital certificate;
- determining that the consistency verification succeeds and identity verification of the first communication terminal based on the second digital certificate succeeds;
- generating an encrypted communication key; and
- performing encrypted communication with the first communication terminal based on the encrypted communication key.

12. The computer device according to claim 11, wherein the first digital certificate is returned by the first communication terminal in response to the encrypted communication connection request when a data amount of the first digital certificate is greater than a data amount threshold.

13. The computer device according to claim 12, wherein the method further comprises:
    determining that the data amount of the first digital certificate is less than or equal to the data amount threshold;
    transmitting a second key negotiation request to the first communication termina;
    receiving the first digital certificate returned by the first communication terminal in response to the second key negotiation request;
    performing identity verification on the first communication terminal based on the received first digital certificate;
    generating the encrypted communication key when the identity verification succeeds; and
    performing encrypted communication with the first communication terminal based on the encrypted communication key.

14. The computer device according to claim 11, wherein the first content in the first digital certificate supports a quantum-resistant algorithm.

15. One or more non-transitory computer-readable storage media, storing computer-readable instructions, the computer-readable instructions, when executed by a processor of a computer device acting as a second communication terminal, causing the computer device to implement a network communication method including:
    transmitting an encrypted communication connection request for a first digital certificate to a first communication terminal;
    receiving a second digital certificate from the first communication terminal, the second digital certificate being a short version of the first digital certificate actually received by the second communication terminal from the first communication terminal in response to the encrypted communication connection request, wherein the first digital certificate comprises a first content and content index information corresponding to the first content;
    receiving a third digital certificate returned by the first communication terminal in response to a first key negotiation request transmitted to the first communication terminal, the third digital certificate being a compressed digital certificate generated by the first communication terminal through compression of the first content in the first digital certificate in a preset compression manner;
    performing consistency verification on the second digital certificate and the compressed digital certificate, further including:
        compressing a second content in the second digital certificate indicated through the content index information in the preset compression manner, to obtain a second compressed content;
        updating, in the second digital certificate, the second content with the second compressed content, to obtain a comparative digital certificate; and
        performing consistency verification on the comparative digital certificate and the compressed digital certificate;
    determining that the consistency verification succeeds and identity verification of the first communication terminal based on the second digital certificate succeeds;
    generating an encrypted communication key; and
    performing encrypted communication with the first communication terminal based on the encrypted communication key.

16. The non-transitory computer-readable storage media according to claim 15, wherein the first digital certificate is returned by the first communication terminal in response to the encrypted communication connection request when a data amount of the first digital certificate is greater than a data amount threshold.

17. The non-transitory computer-readable storage media according to claim 16, wherein the method further comprises:
    determining that the data amount of the first digital certificate is less than or equal to the data amount threshold;
    transmitting a second key negotiation request to the first communication termina;
    receiving the first digital certificate returned by the first communication terminal in response to the second key negotiation request;
    performing identity verification on the first communication terminal based on the received first digital certificate;
    generating the encrypted communication key when the identity verification succeeds; and
    performing encrypted communication with the first communication terminal based on the encrypted communication key.

\* \* \* \* \*